United States Patent [19]
Akagi

[11] Patent Number: 5,919,584
[45] Date of Patent: Jul. 6, 1999

[54] FUEL CELL

[75] Inventor: Kosuke Akagi, Ikoma, Japan

[73] Assignee: Osaka Gas Co., Ltd., Japan

[21] Appl. No.: 08/879,177

[22] Filed: Jun. 20, 1997

[30] Foreign Application Priority Data

| Jun. 20, 1996 | [JP] | Japan | 8-159309 |
| Jan. 29, 1997 | [JP] | Japan | 9-015089 |
| Feb. 14, 1997 | [JP] | Japan | 9-029971 |
| Feb. 14, 1997 | [JP] | Japan | 9-029972 |
| Apr. 18, 1997 | [JP] | Japan | 9-101374 |

[51] Int. Cl.$^6$ .................................................. H01M 8/04
[52] U.S. Cl. ................................ 429/34; 429/20; 429/26
[58] Field of Search .................................. 429/20, 26, 32, 429/34, 39

[56] References Cited

U.S. PATENT DOCUMENTS

| 4,692,391 | 9/1987 | Hirota | 429/39 X |
| 4,719,157 | 1/1988 | Tsutsumi et al. | 429/34 |
| 4,788,110 | 11/1988 | Bernard | 429/39 X |
| 4,874,678 | 10/1989 | Reichner | 429/32 X |
| 5,023,152 | 6/1991 | Akagi | 429/32 |
| 5,208,115 | 5/1993 | Akagi | 429/26 |
| 5,324,565 | 6/1994 | Leonida et al. | 429/34 X |
| 5,508,128 | 4/1996 | Akagi | 429/32 X |

*Primary Examiner*—Stephen Kaafut
*Attorney, Agent, or Firm*—Webb Ziesenheim Bruening Logsdon Orkin & Hanson, P.C.

[57] ABSTRACT

A fuel cell includes a plurality of cells each of which includes a solid electrolyte layer having an oxygen electrode on one side thereof and a fuel electrode on the other side thereof, the cells being stacked one above another with a predetermined space therebetween so as to form an oxygen-containing gas passage facing the oxygen electrode and a fuel gas passage facing the fuel electrode, a passage forming member interposed between the adjacent cells to section the oxygen-containing gas passage and the fuel gas passage, the passage forming member having electric conductivity; and a conductive member charged within a space between the passage forming member and the fuel electrode or between the passage forming member and the oxygen electrode, the conductive member having a porous construction to allow passage of gas therethrough as well as flexibility. The adjacent cells are electrically conductively connected with each other via the passage forming member and the conductive member. A void portion is provided in the space charged with the conductive member in the form of a continuous gas passage extending between opposed ends of the fuel cell along a direction of gas flow.

22 Claims, 31 Drawing Sheets

FUEL CELL

BACKGROUND OF THE INVENTION

1. Field of the Invention

The present invention relates to improvement of a fuel cell construction.

2. Description of the Related Art

In a fuel cell, an electrically conductive member is interposed between a flow passage forming member and a fuel electrode or between a flow passage forming member and an oxygen electrode, thereby to conductively connect adjacent cells via the flow passage forming member and the conductive member. Also, as fuel gas is caused to flow between the passage forming member and the fuel electrode, i.e. through the conductive member charged within a fuel gas passage, the fuel gas is caused to flow while contacting the fuel electrode. Or, oxygen-containing gas is caused to flow between the passage forming member and the oxygen electrode, i.e. through the conductive member charged within an oxygen-containing gas passage, the oxygen-containing gas is caused to flow while contacting the oxygen electrode.

Conventionally, the conductive member is formed entirely uniform, and such uniform conductive member is charged within the entire space between the passage forming member and the fuel electrode or between the passage forming member and the oxygen electrode. Accordingly, the entire fuel gas flowing through the fuel passage is caused to flow through the conductive member over the entire area of this fuel passage. Or, the entire oxygen-gas containing gas flowing through the oxygen-containing gas passage is caused to flow through the conductive member over the entire area of this passage.

However, although the conductive member is provided with a porous construction in order to allow passage of gas therethrough, the conductive member provides significant resistance against the gas flow. Thus, it has been necessary to increase the feeding pressure of the fuel gas or oxygen-containing gas to be circulated through the conductive member.

Therefore, a gas passage provided in communication with the fuel gas passage for allowing supply of the fuel gas to this fuel gas passage or a gas passage provided in communication with the oxygen-containing gas passage for allowing supply of the oxygen-containing gas to this oxygen-containing gas passage needs to be maintained under gas-tight condition against such high gas feeding pressure. For this purpose, members for constituting the gas passage need to be formed of material having high pressure resistance, or a high-performance sealing construction was needed to maintain the gas passage under the gas-tight condition. And, these requirements have led to increase of the costs of the fuel cell.

The present invention attends to the above-described state of the art, and a primary object of the invention is to make it possible to reduce the feeding pressure of the fuel gas or oxygen-containing gas to be fed through the conductive member so as to achieve cost reduction of the fuel cell.

SUMMARY OF THE INVENTION

For accomplishing the above-noted object, a fuel cell, according to the present invention, comprises:

a plurality of cells each of which includes a solid electrolyte layer having an oxygen electrode on one side thereof and a fuel electrode on the other side thereof, the cells being stacked one above another with a predetermined space therebetween so as to form an oxygen-containing gas passage facing the oxygen electrode and a fuel gas passage facing the fuel electrode;

a passage forming member interposed between the adjacent cells to section the oxygen-containing gas passage and the fuel gas passage, the passage forming member having electric conductivity;

a conductive member charged within a space between the passage forming member and the fuel electrode or between the passage forming member and the oxygen electrode, the conductive member having a porous construction to allow passage of gas therethrough as well as flexibility;

the adjacent cells being electrically conductively connected with each other via the passage forming member and the conductive member; and a void portion provided in the space charged with the conductive member in the form of a continuous gas passage extending between opposed ends of the fuel cell along a direction of gas flow.

With the above-described construction, in the space charged with the conductive member at an intermediate portion of this space in the cell stacking direction, there is provided a void portion in the form of a continuous gas passage extending between the opposed ends of the fuel cell along the gas flow direction. Then, the fuel gas or oxygen-containing gas is caused to flow through both the conductive member and the void portion.

Accordingly, while the fuel gas or the oxygen-containing gas is maintained in contact with the fuel electrode or the oxygen electrode, as the void portion provides much smaller resistance against the gas flow, the feeding pressure of the fuel gas or oxygen-containing gas to be circulated through the conductive member may be reduced advantageously.

Moreover, in spite of the presence of the void portion in the charged space, the conductive member may be maintained in contact with the entire area of the fuel electrode or oxygen electrode of the cell. Thus, the above-described construction does not result in reduction in the area of contact or in the bonding force between the conductive member and the passage forming member or between the conductive member and the fuel or oxygen electrode of the cell.

Accordingly, with the above-construction, it is possible to prevent increase in the electric resistance between the conductive member and the fuel or oxygen electrode of the cell.

As a result, while avoiding increase in the internal resistance of the fuel cell, it has become possible to employ, as material for forming the gas passages, material having a lower pressure resistance than the convention or to reduce the requirement of the sealing construction for maintaining the gas passages in the gas-tight condition. Consequently, the manufacture costs of the fuel cell have been reduced.

According to one preferred embodiment of the present invention, the conductive member is made of a conductive felt-like member.

The conductive felt-like member is superior in all of conductivity, air-permeability and flexibility. Moreover, this member is easy to fabricate. Hence, this specific construction of the conductive member is preferred in terms of both performance and cost.

According to a further embodiment of the present invention, the void portion is provided at a position corresponding to an intermediate portion of the conductive member in the cell stacking direction.

In this case, the void portion is provided in the conductive member per se. Then, there is no necessity of providing any separate member, other than the conductive member, for providing the void portion.

Therefore, in embodying the present invention, this construction may be simplified and its manufacture costs may be further reduced.

According to a still further embodiment of the present invention, the void portion is provided as an elongate portion extending along the gas flow direction, and a plurality of such elongate void portions are provided side by side along the face of the cell.

That is to say, between the adjacent elongate void portions, the elongate conductive member extending along the gas flow direction is provided, and a plurality of such elongate conductive members are disposed side by side along the face of the cell. Then, with these elongate conductive members disposed side by side along the face of the cell, it is possible to maintain good contact between the conductive member and the passage forming member and also between the conductive member and the fuel or oxygen electrode.

Therefore, in spite of the formation of the void portion, this does not result in deterioration in the contact condition between the conductive member and the passage forming member or between the conductive member and the fuel or oxygen electrode, which deterioration leads to disadvantageous increase in the internal resistance of the fuel cell.

According to a still further embodiment of the present invention, the conductive member is divided in the cell stacking direction into a void forming portion forming the void portion in the form of e.g. a recess or a through portion extending through in the cell stacking direction, the void portion being formed by overlapping the divided portions of the conductive member with each other.

If, for instance, the conductive member is provided as one integral member and the void portion is formed by defining a tunnel-like hole in this integral member, the formation of such tunnel-like hole will be difficult, thus leading to cost increase.

On the other hand, in the case of the separate type conductive member including, as a separate member, the void forming portion in the form of a recess or a through hole, the respective portions or members may be manufactured easily.

Accordingly, the manufacturing cost of the conductive member provided with the void portion may be reduced, so that the entire costs needed for implementing the present invention will be reduced also.

According to a still further embodiment of the present invention, the conductive member includes, as separate portions, a first conductive member contacting the passage forming member and having the recess for forming the vacant portion and a second conductive member contacting the fuel electrode or the oxygen electrode and including a closing portion for closing the opening of the recess formed in the first conductive member.

That is to say, when the conductive member is divided into a plurality of portions in the cell stacking direction, the number of the divided portions is limited to the minimum of two, and also the shape of the second conductive member may be as simple as a flat plate, for instance. Then, a face of this second conductive member in the form of a flat plate, on the side of the first conductive member, may be used as the closing portion, and as the first conductive member and second conductive member are overlapped one on the other with the opening of the recess of the first conductive member being closed with the second conductive member, the vacant portion is formed.

Therefore, the manufacturing cost of the conductive member may be further reduced, then, the entire costs needed for implementing the present invention may be still further reduced.

According to a still further embodiment of the present invention, the conductive member is divided in the cell stacking direction into two portions including a cell-side portion contacting the fuel electrode or oxygen electrode and a passage-forming-member-side portion contacting the passage forming member.

And, between the cell-side portion and the passage-forming-member-side portion of the conductive member, there is interposed a vacant forming member having dense structure and electric conductivity for forming the vacant portion in such a manner that the vacant portion is opened at least to the cell-side portion.

With the above-described construction, since the vacant forming portion of the space charged with the conductive member is dense, the fuel gas or oxygen-containing gas will not flow through this portion. Also, the vacant portion is opened to the cell-side portion of the conductive member so as to allow the fuel or oxygen-containing gas to flow into the cell-side portion of the conductive member. Hence, it is possible to increase the ratio of the fuel gas or oxygen-containing gas flowing into the charged space which flows through the cell-side portion of the conductive member.

Further, although the above construction requires the vacant forming member separately from the conductive member in order to form the vacant portion, the construction allows use of material having high density and conductivity, such as metal, as the material for forming the vacant forming member. Thus, it becomes possible to avoid increase of electric resistance due to the provision of the vacant portion.

Accordingly, while each cell is capable of generating electricity very efficiently, with the reduction of the internal resistance, the total output of the fuel cell may be increased.

According to a still further embodiment of the present invention, the vacant forming member is provided in the form of a plate member, and one side of this plate member contacting the cell-side portion of the conductive member defines a groove functioning as the vacant portion.

With the above-described construction, the vacant forming member is provided in the form of one integral plate member defining a groove functioning as the vacant portion, so that this member may be readily interposed between the cell-side portion and the passage-forming-member-side portion of the conductive member. Incidentally, the vacant forming member may alternatively be formed from a plurality of prism-like elements disposed side by side to form the vacant portion. However, such construction has the disadvantage of the increased number of components.

Hence, with the above construction, with the simplicity of the assembly, the manufacturing costs may be further reduced.

According to a still further embodiment of the present invention, the conductive member has such aperture ratio arrangement in the cross sectional direction along the cell stacking direction that a portion of the conductive member contacting the fuel electrode or oxygen electrode has a greater aperture ratio than the other portion thereof.

That is to say, in the conductive member, the portion thereof contacting the fuel or oxygen electrode is provided with a smaller resistance against the gas flow so as to increase the amount of the fuel gas or oxygen-containing gas flowing through this portion while the other portion of the conductive member than the foregoing portion contacting the fuel electrode or oxygen electrode is provided with a smaller electric resistance, thereby to reduce the electric resistance of the entire conductive member.

Accordingly, while each cell is capable of generating electricity very efficiently, with the reduction of the internal resistance, the total output of the fuel cell may be further increased.

Further and other features and advantages of the present invention will become apparent from the following more detailed description of the invention with reference to the accompanying drawings.

DESCRIPTION OF THE PREFERRED EMBODIMENTS

FIRST EMBODIMENT

Figure 1:
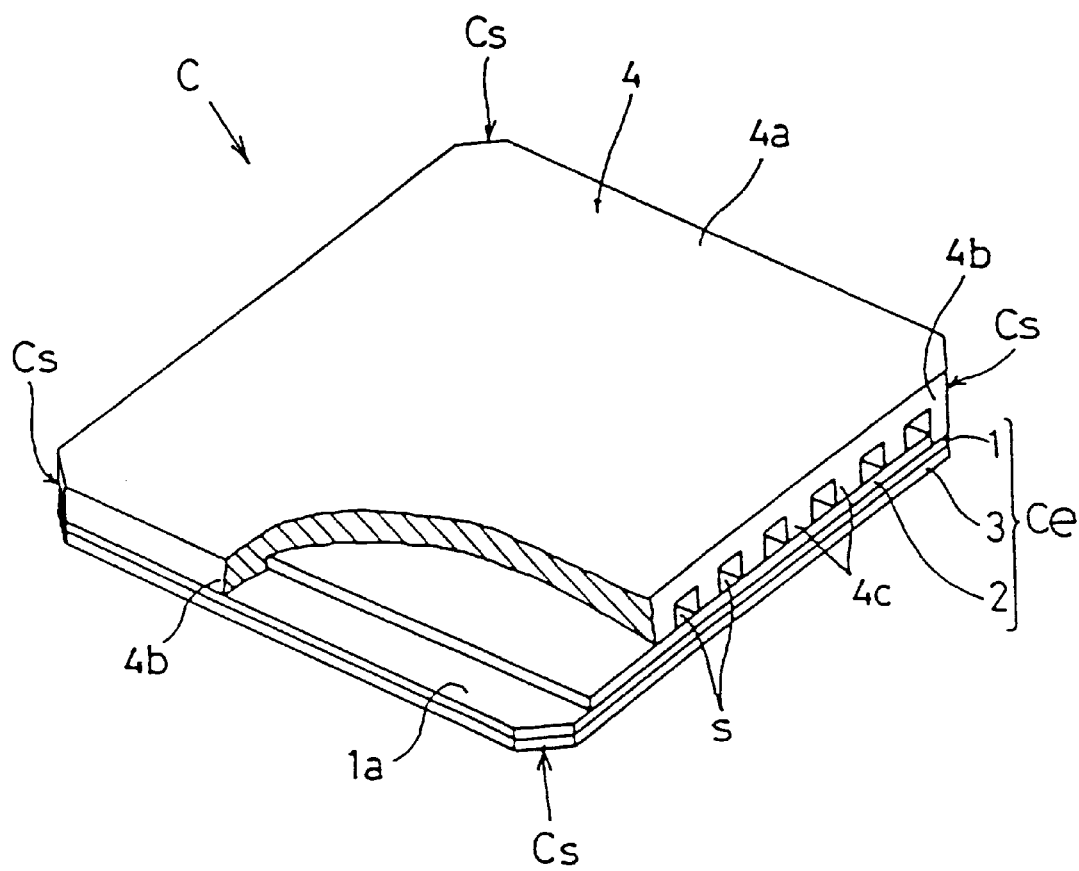
FIG. 1 is a perspective view showing a cell construction of a fuel cell relating to a first embodiment of the invention.

Referring to FIGS. 1 through 7, a first embodiment of the invention will be described.

As shown in FIGS. 1 through 7, a cell Ce includes a solid electrolyte layer 1 having an oxygen electrode 2 on one side thereof and a fuel electrode 3 on the other side thereof. Then, a plurality of cells Ce are stacked with a predetermined space therebetween to form oxygen-containing gas passages (s) on the side facing the oxygen electrodes 2 and fuel gas passages (f) on the other side facing the fuel electrodes 3. Further, between each adjacent cells Ce, there is interposed a conductive separator 4 as a passage forming member sectioning the oxygen-containing gas passages (s) and the fuel gas passages (f) and having electric conductivity. Also, between a space between the conductive separator 4 and the fuel electrode 3, there is charged a conductive member 7 having a porous structure for allowing passage of gas therethrough as well as flexibility. With these, a stacked cell assembly NC is formed.

Then, the adjacent cells Ce are conductively connected with each other via the conductive separator 4 and the conductive member 7.

Between the conductive separator 4 and the fuel electrode 3, i.e. in the space charged with the conductive member 7 and at an intermediate portion of the charged space in the cell stacking direction, there are formed vacant portions V each in the form of a continuous gas passage extending between the opposed ends in the direction of gas flow.

Further, the vacant portion V is provided at an intermediate position of the conductive member in the cell stacking direction.

First, with reference to FIG. 1, the cell Ce of the fuel cell will be described in greater details.

On the one side of the planar rectangular plate-like solid electrolyte layer 1, there is integrally attached the oxygen electrode 2 in the form of a film or a plate, with forming an electrolyte-layer-exposed portion 1a on each of a pair of edges thereof and extending over the entire length of the side edge. Further, on the other side thereof, the fuel electrode 3 in the form of a film or a plate, is integrally attached over the entire or substantially entire side. With these, there is formed the rectangular, three-layer cell Ce for obtaining an electromotive force via the oxygen electrode 2 and the fuel electrode 3.

Then, on the side of the cell Ce facing the oxygen electrode 2, the conductive separator 4 is attached to form and section the oxygen-containing gas passages (s). With this, there is formed a rectangular cell C having the conductive separator 4 attached thereto.

More particularly, the conductive separator 4 includes a plate-like portion 4a and a pair of band-like projecting portions 4b disposed on the opposed sides of the plate-like portion 4a, with a plurality of convex ridge portions 4c formed between the pair of band-like projecting portions 4b. These portions are integrally formed of conductive material. Then, the conductive separator 4 is affixed in such a manner that each of the pair of band-like projecting portions 4b is affixed to the opposed electrolyte-layer-exposed portions 1a with the respective convex ridge portions 4c being placed in contact with the oxygen electrode 2. With these, the cell C attached with the separator is formed.

And, the oxygen electrode 2 and the conductive separator 4 are conductively connected with each other and, between the oxygen electrode 2 and the conductive separator 4, there are formed the oxygen-containing gas passages (s) opened on the pair of end faces of the separator-attached cell C.

That is to say, in the separator-attached cell C, due to the conductive separator 4, the pair of opposed end faces are opened end faces where the oxygen-containing gas passages (s) are opened, while the other opposed ends are provided as closed end faces. Incidentally, in the following description, the end edges where the oxygen-containing gas passages (s) are opened will be referred to as the opened end edges, the end face where the oxygen-containing gas passages (s) are opened will be referred to as the opened end face and the end face where the oxygen-containing gas passages (s) are closed will be referred to as the closed end face, respectively.

The four corners of the conductive separator 4, solid electrolyte layer 1 and the fuel electrode 3 are cut off to provide an inclined shape. With this, as will be described in greater details later, there is formed an inclined portion Cs at each of the opposed ends of the closed end faces of the separator-attached cell C.

The solid electrolyte layer 1 is formed of $ZrO_2$ of tetragonal system including about 3 mol % of solid-dissolved Yt and the oxygen electrode 2 is formed of $LaMnO_3$ and the fuel electrode is formed of cermet of Ni and $ZrO_2$.

Further, the conductive separator 4 is formed of $LaCrO_3$ having superior oxidation resistance and reduction resistance.

Also, the conductive member 7 having flexibility is formed of felt-like material having good heat resistance and reduction resistance.

Next, with reference to FIGS. 2 through 6, there will be described a stacking construction for forming the stacked cell assembly NC including a plurality of separator-attached cells C stacked, with the cells C being serially electrically connected with each other.

Numeral 5, in the drawings, denotes a rectangular plate-like, cell retaining member disposed adjacent each of the pair of opened end edges of the separator-attached cell C. This cell retaining member 5 includes a cut-in portion 5a into which the opened end edge of the cell C is inserted and a hole 5b facing the cut-in portion 5a and extending through in the direction of thickness of the cell retaining member 5. The cut-in portion 5a includes a pair of abutment faces 5c to be placed in contact with the closed end faces adjacent the opposed ends of the opened end edge of the cell C inserted into the cut-in portion 5a. Further, the cut-in portion 5a is provided with a depth substantially equal to the thickness of the separator-attached cell C.

Further, the pair of abutment faces 5c are formed with such an inclination that the faces approach each other as departing from the opened end edge of the separator-attached cell C. And, for allowing tight contact with these inclined abutment faces 5c, the separator-attached cell C includes, at each of the opposed ends of the closed end face thereof the inclined portion Cs.

Also, in an inner face of the cut-in portion 5a of the cell retaining member 5, there is formed a groove 5e into which sealing member is charged as will be described later. Further, though not shown, in the opposite face of the cell retaining member 5 to the face defining the cut-in portion 5a, there is formed a similar groove 5e which is overlapped with the groove 5e defined in the inner face of the cut-in portion 5a as viewed from the direction of thickness.

Further, in the end face forming the cut-in portion 5a of the cell retaining member 5, there is formed a groove 5f for forming a fuel gas supply passage Fi to be described later.

Then, a plurality of the above-described, separator-attached cells C are stacked to be retained by the pair of cell retaining members 5, with orienting each fuel electrode 3 outside of the cut-in portion 5a and with each of the opposed opened end edges being inserted into the respective cut-in portion 5a. Further, between the separator-attached cells C disposed adjacent each other in the cell stacking direction (i.e. between the conductive separator 4 and the fuel electrode 3 of the cell Ce), the conductive member 7 is charged.

That is to say, the separator-attached cells C adjacent in the cell stacking direction are electrically conductively connected with each other via the conductive member 7. In other words, the cells Ce adjacent each other in the cell stacking direction are conductively connected with each other via the conductive separator 4 and the conductive member 7.

Moreover, in the cell stacking direction, the end of the separator-attached cell C where the fuel electrode 3 is exposed, a pair of cell retaining members 8 are provided to overlap the pair of cell retaining members 5 disposed at this end in order to form fuel gas passages (f) for this fuel electrode 3.

Figure 2:
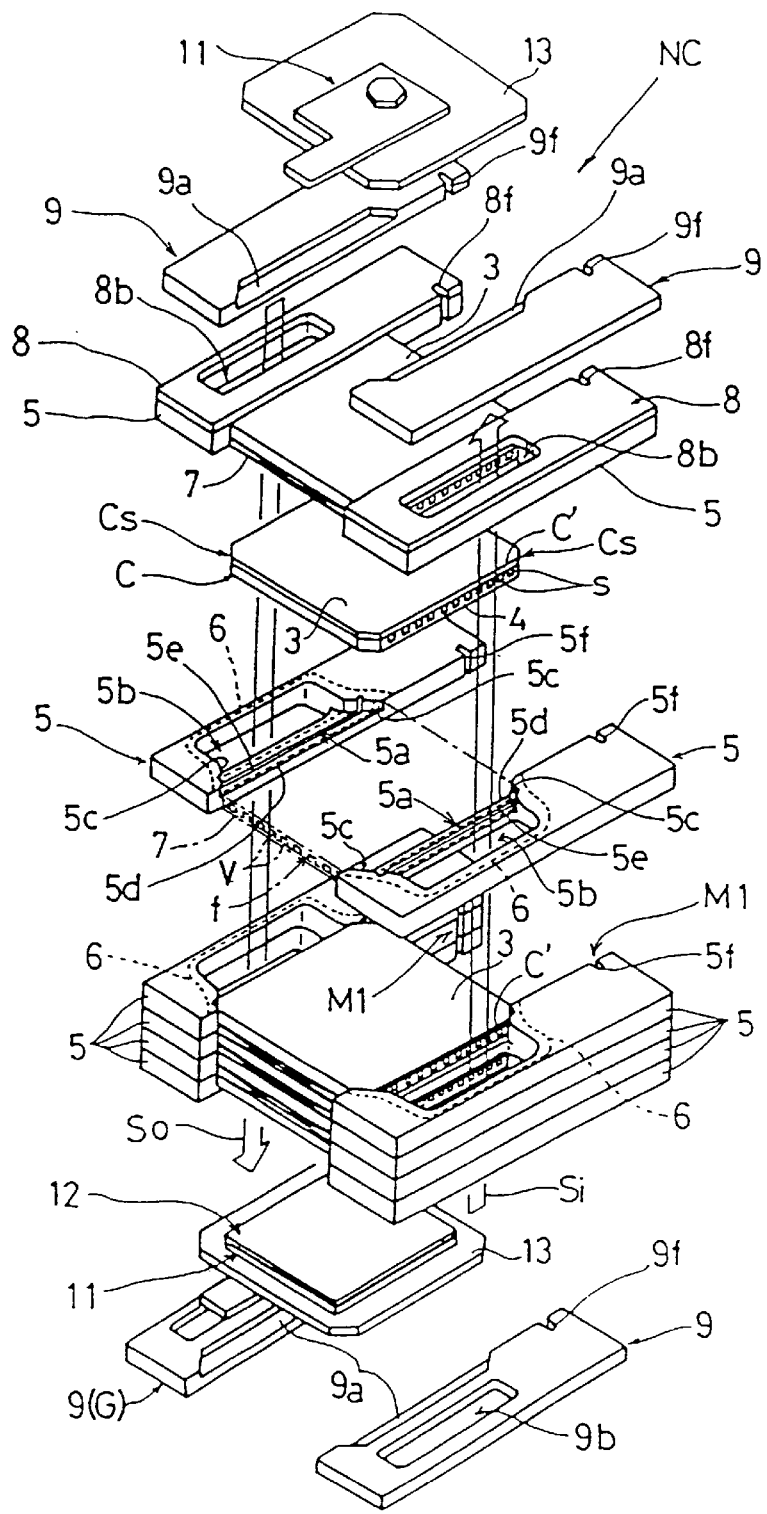
FIG. 2 is an exploded perspective view showing a construction of a stacked cell assembly relating to the first embodiment.

Incidentally, in constructing the stacked cell assembly NC, sealing material is charged within the grooves 5e of the cell retaining members 5 and between the cell retaining members 5 adjacent each other in the cell stacking direction, as denoted by broken lines 6 in FIG. 2.

The cell retaining member 8 has a rectangular outer configuration, in the cell stacking direction, similar to that of the cell retaining member 5, and this retaining member 8 includes a hole 8b overlapped with the hole 5b of the cell retaining member 5 and a groove 8f overlapped with the groove 5f of the cell retaining member 5.

Incidentally, when the opened end edge of the separator-attached cell C is inserted into the cut-in portion 5a of the cell retaining member 5, the cell retaining member 5 will be pressed against the opened end edge of the separator-attached cell C, whereby the abutment faces 5c are brought into tight contact with the respective inclined portions Cs of the closed end face of the opposed ends of the separator-attached cell C.

That is to say, by means of a thin portion 5d of the cell retaining member 5 formed by forming the cut-in portion 5a, the separator-attached cells C adjacent in the cell stacking direction are retained in position with a predetermined distance therebetween, and as this thin portion 5d sections the opposed side faces of the adjacent separator-attached cells C from each other, the fuel gas passages (f) are formed between these adjacent separator-attached cells C.

At the periphery of the opened end of the separator-attached cell C where the oxygen-containing gas passages (s) are opened, the thin portion 5d and the pair of abutment faces 5c of this separator-attached cell C and also the back face of the adjacent cell retaining member 5 are placed in tight contact with the periphery via sealing material, whereby the openings of the oxygen-containing gas passages (s) and the openings of the fuel gas passages (f) are gas-tightly sectioned from each other.

The fuel gas passages (f) are closed on the both opened end faces of the separator-attached cell C and are opened on the both closed end faces of this cell C.

The cell retaining member 5 and the cell retaining member 8 are formed of ceramic material having heat resistance and electric insulating property. Further, the sealing material is composed mainly of glass material or ceramic material having heat resistance and electric insulating property, and this material, by being heated up to 1000° C., provides a boding force as well as gas-tight property.

Next, the conductive member 7 will be described in greater details.

Figure 7:
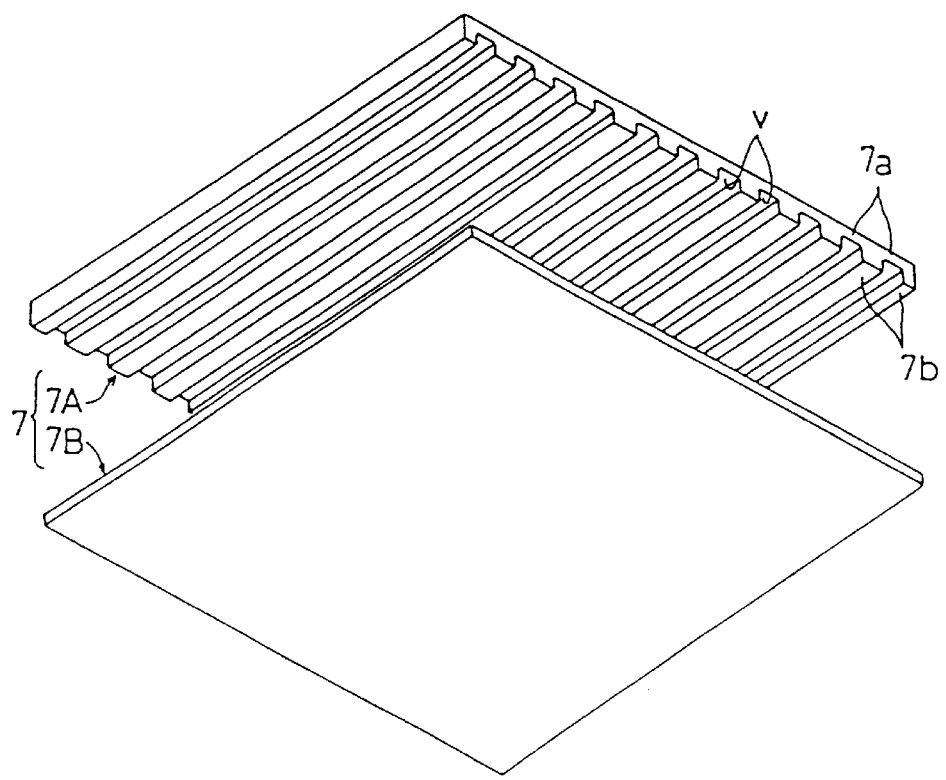
FIG. 7 is a perspective view showing a construction of a conductive member relating to the first embodiment.

As shown also in FIG. 7, the conductive member 7 includes a first conductive member 7A placed in contact with the conductive separator 4 and having recesses (v) for forming the vacant portion V and a second conductive member 7B placed in contact with the fuel electrode 3 and having a closing portion for closing the openings of the recesses (v) of the first conductive member 7A.

The first conductive member 7A is formed by pressing felt-like material of Ni on one side of a rectangular plate portion 7a having an area substantially equal to that of the cell Ce, with forming a plurality of ridges 7b disposed in parallel with a predetermined distance therebetween. And, the recess (v) for forming the vacant portion V is formed between the adjacent ridges 7b.

The second conductive member 7B is formed as a rectangular plate member having an area equal to that of the plate portion 7a of the first conductive member 7A.

Then, as the first conductive member 7A and the second conductive member 7B are placed one on the other and the openings of the recesses (v) of the first conductive member 7A are closed by the second conductive member 7B, the vacant portion V is formed Accordingly, the face of the second conductive member 7B on the side of the first conductive member 7A functions as the closing portion for closing the openings of the recesses (v) of the first conductive member 7A.

And, this conductive member 7 comprising the first conductive member 7A and the second conductive member 7B placed one on the other is charged between the separator-attached cells C adjacent each other in the cell stacking direction, with the ridges 7b being aligned along the gas flow direction.

That is to say, the vacant portion V is provided at an intermediate portion of the conductive member 7 in the cell stacking direction. Further, the vacant portion V is formed as an elongate portion extending along the direction of gas flow. Then, a plurality of these elongate vacant portions V are provided side by side along the face of the cell Ce.

Incidentally, the felt-like Ni material forming the second conductive member 7B is less dense than the felt-like Ni material forming the first conductive member 7A. That is to say, in the conductive member 7, a portion thereof contacting the fuel electrode 3 has a greater aperture ratio than the other portion thereof in the direction of cross section along the cell stacking direction.

Next, with reference to FIGS. 2 through 5, there will be described a construction for obtaining electric power from the end portion of the stacked cell assembly NC in the cell stacking direction.

For each of the separator-attached cells C disposed at the opposed ends of the stacked cell assembly NC in the cell stacking direction, there is provided a conductive felt-like member 12 placed in contact with the cell C. Further, a collector portion 11 is provided in contact with the conductive felt-like member 12, so that electric power is obtained from the collector portions 11.

More particularly, at the opposed ends in the cell stacking direction of the stacked cell assembly NC, a pair of collector portion retaining members 9 are disposed respectively over the pair of cell retaining members 5 or the cell retaining members 8.

The collector portion retaining member 9 is formed as a plate-like member having an outer configuration as viewed in the cell stacking direction, similar to that of the cell retaining member 5.

Also, the collector portion retaining member 9 defines a cut-in portion 9a for introducing an end edge of a collector portion support member 13. Further, the collector portion retaining member 9 defines a groove 9f overlapped with the groove 5f of the cell retaining member 5.

The collector portion retaining member 9 provided at one end of the stacked cell assembly NC in the cell stacking direction defines a hole 9b having a same shape as the hole 5b of the cell retaining member 5 and overlapped with the hole 5b.

Then, the collector portion 11 is supported to the collector portion support member 13, and opposed end edges of this supported collector portion 11 are inserted into the respective cut-in portions 9a of the pair of collector portion retaining members 9, and the conductive felt-like member 12 is placed in contact with the collector plate 11 and the separator-attached cell C and retained to the pair of collector portion retaining members 9.

The groove 5f of each cell retaining member 5, the groove 8f of the cell retaining member 8 and the groove 9f of the collector portion retaining member 9 are disposed in continuous communication with each other in the cell stacking direction, thereby to form a pair of grooves M1 for forming a supply fuel gas passage Fi to be described later.

Further, in the stacked cell assembly NC, the hole 5b of each cell retaining member 5, the hole 8b of the cell retaining member 8 and the hole 9b of the collector portion retaining member 9 are disposed in continuous communication with each other, thereby to form two passages communicated respectively with the oxygen-containing gas passages (s). One of the two passages is used as the supply oxygen gas passage Si while the other is used as an exhaust oxygen gas passage So, respectively.

And, by means of the collector portion retaining member 9 which does not have the hole 9b, the both oxygen gas passages Si, So are closed.

The collector portion retaining member 9 and the collector portion support member 13 are formed of ceramic material having heat resistance and electric insulating property. The collector portion 11 is formed of Ni, and the conductive felt-like member 12 is formed of felt-like Ni material.

Figure 3:
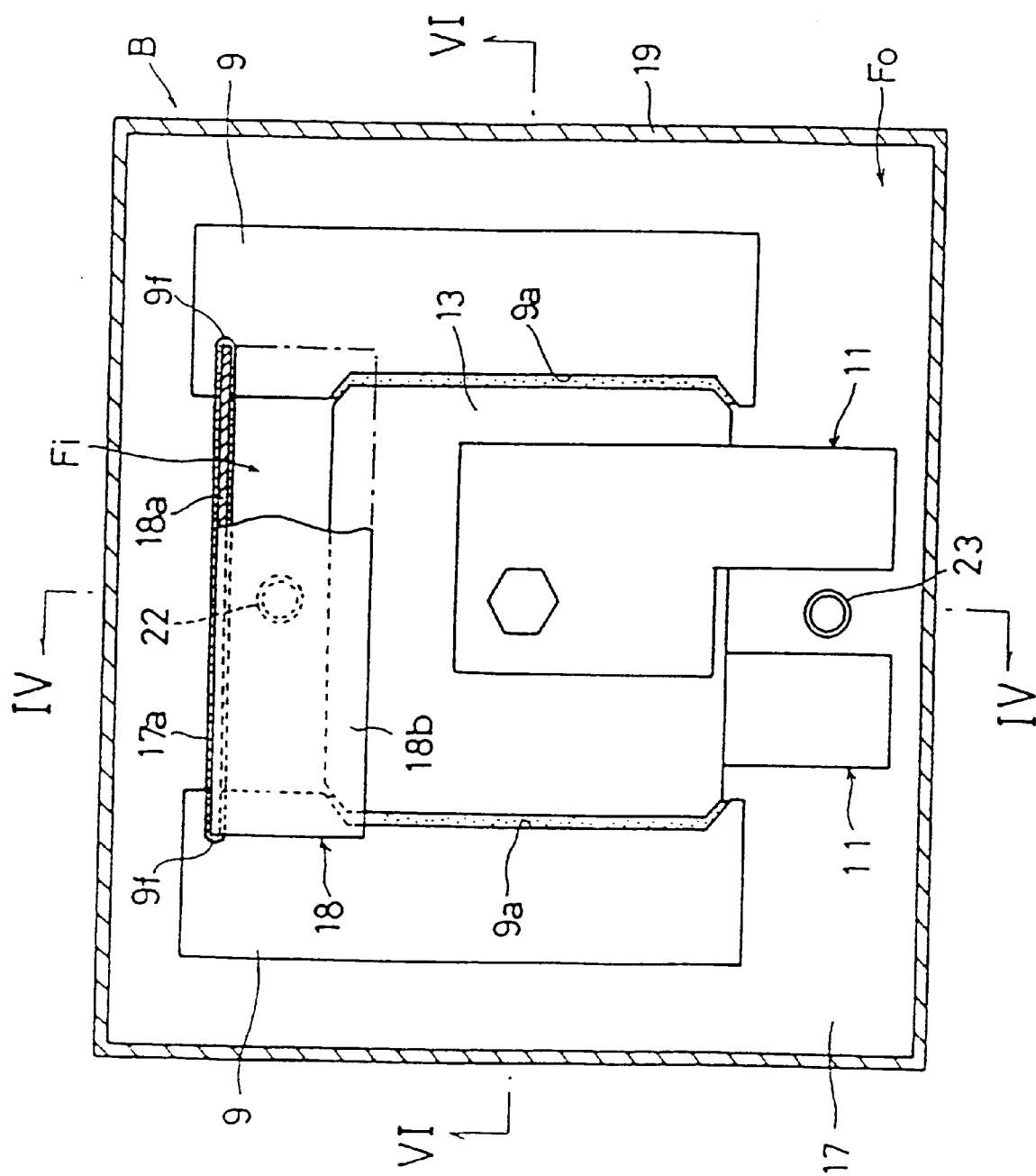
FIG. 3 is a plan view in horizontal section showing the entire construction of the fuel cell relating to the first embodiment.
Figure 4:
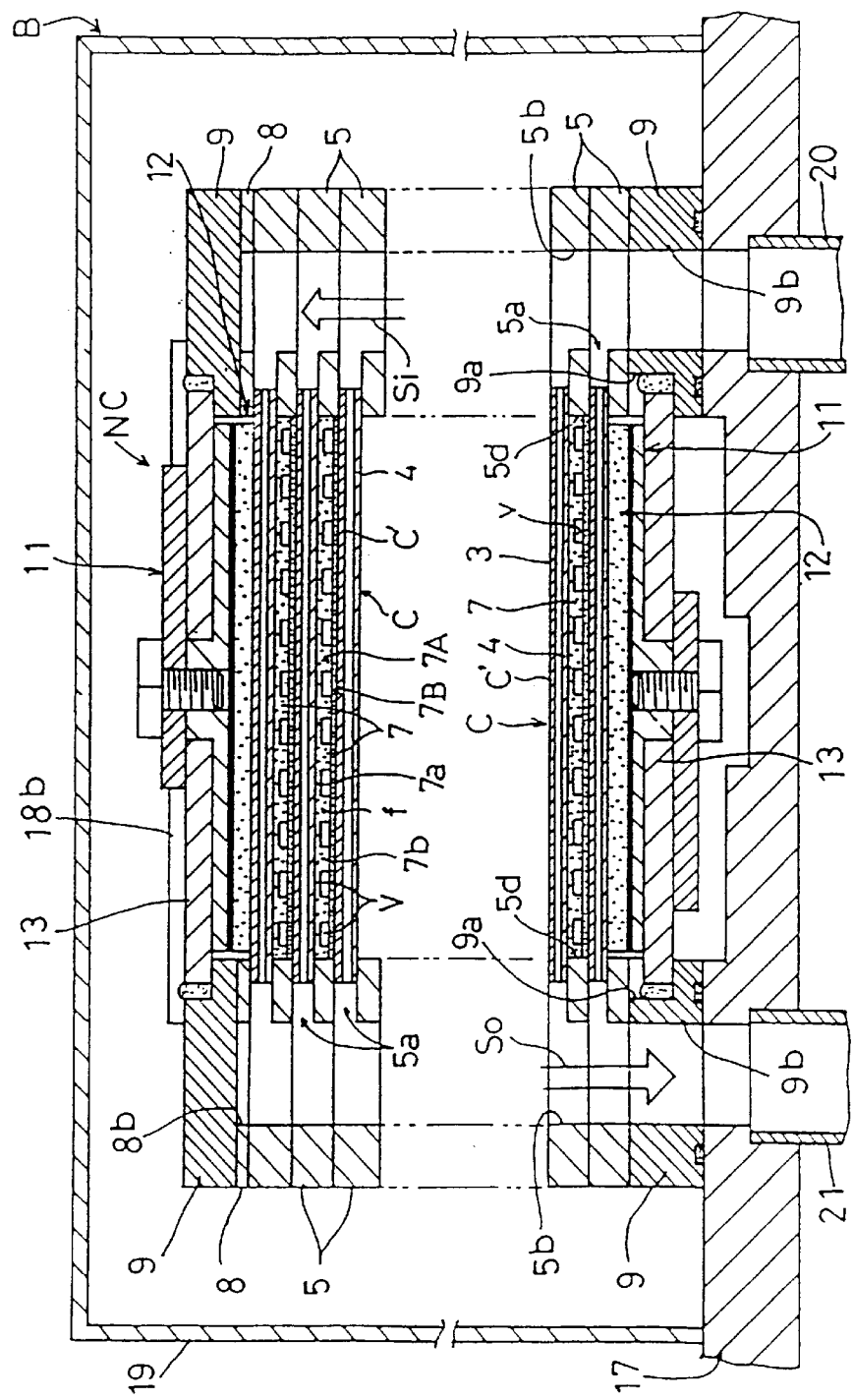
FIG. 4 is a section taken along a line IV—IV in FIG. 3.
Figure 5:
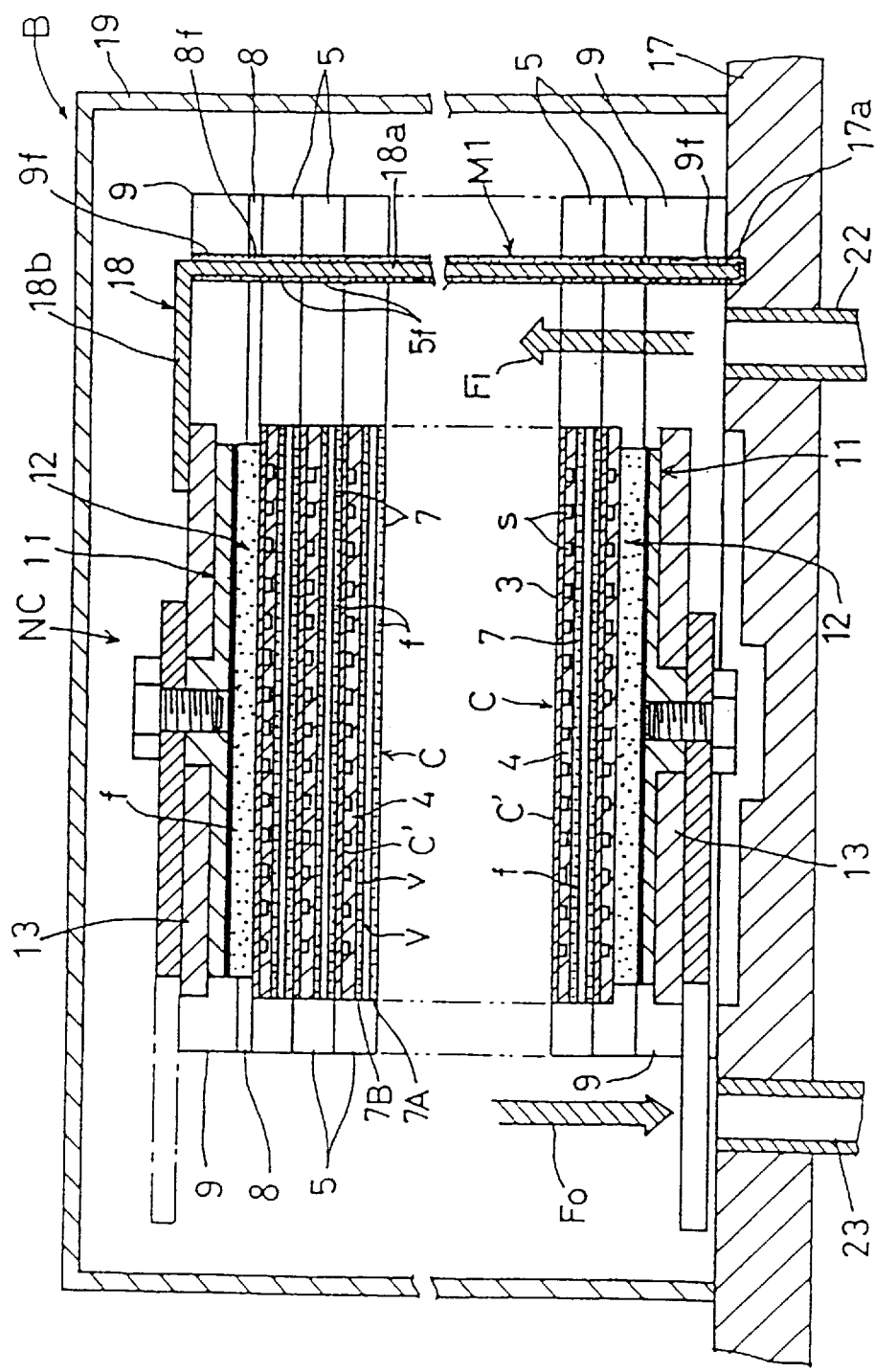
FIG. 5 is a section taken along a line VI—VI in FIG. 3.
Figure 6:
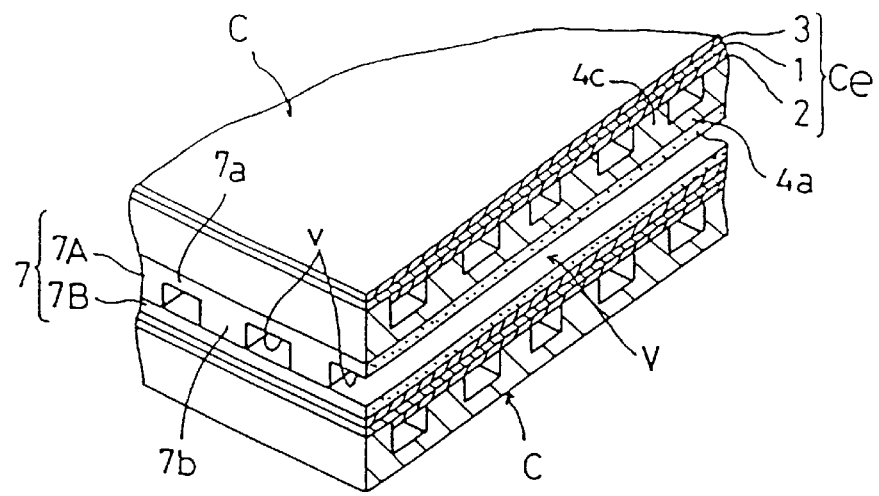
FIG. 6 is a perspective view in vertical section showing principal portions of the stacked cell assembly relating to the first embodiment.

Next, with reference to FIGS. 3 through 5, the general construction of the fuel cell will be described.

The stacked cell assembly NC having the above-described construction is mounted on a base mount 17.

In a top face of the base mount 17, there is formed a groove 17a having opposed ends thereof communicated with the grooves 9f of the pair of collector portion retaining members 9.

A wall partitioning member 18 has a side wall portion 18a and a lid portion 18b which are Lshaped. Then, end edges of the side wall portion 18a are inserted into the pair of grooves M1 and the groove 17a of the base mount 17, and also the lid portion 18b is laid over the pair of collector portion retaining members 9 and the collector support member 13, so that the supply fuel gas passage Fi communicated with the respective fuel gas passages (f) is formed.

Incidentally, the groove M1 and the groove 17a are charged with sealing material.

Further, a bottomed prism-like member 19 is mounted on the base mount 17 in such a manner that the member 19 accommodates the stacked cell assembly NC therein. That is to say, the bottomed prism-like member 19 forms a box-like body B in which the stacked cell assembly NC is accommodated.

The one-side openings of the fuel gas passages (f) of the respective separator-attached cells C are exposed to the inside of the box-like body B, that is, the fuel gas passages (f) are opened to the inner space of the box-like body B.

And, this inner space of the box-like body B is used as the exhaust fuel gas passage Fo communicated with the respective fuel gas passages (f).

The supply oxygen gas passage Si is communicated with an oxygen-containing gas supply pipe 20 via the base amount 17. Whereas, the exhaust oxygen gas passage So is communicated with an oxygen-containing gas exhaust pipe 21 via the base mount 17.

As described hereinbefore, with provision of the vacant portion V at the portion charged with the conductive member 7, the supplying pressure of the fuel gas to be supplied into the supply fuel gas passage F1 may be advantageously reduced. Thus, while reliably preventing leakage of fuel gas from the supply fuel gas passage Fi, the material used for forming the supply fuel gas passage Fi may be material having lower pressure resistance than the material conventionally employed. And, the requirement of the sealing construction for gas-tightly sealing the supply fuel gas passage Fi may be less demanding than the convention. That is to say, in the above-described construction for forming the supply fuel gas passage Fi, the partitioning wall member 18 made of metal is employed for this purpose. With such construction which is simple and does not provide significantly high pressure resistance, it is still possible to reliably prevent fuel gas leak.

SECOND EMBODIMENT

Figure 8:
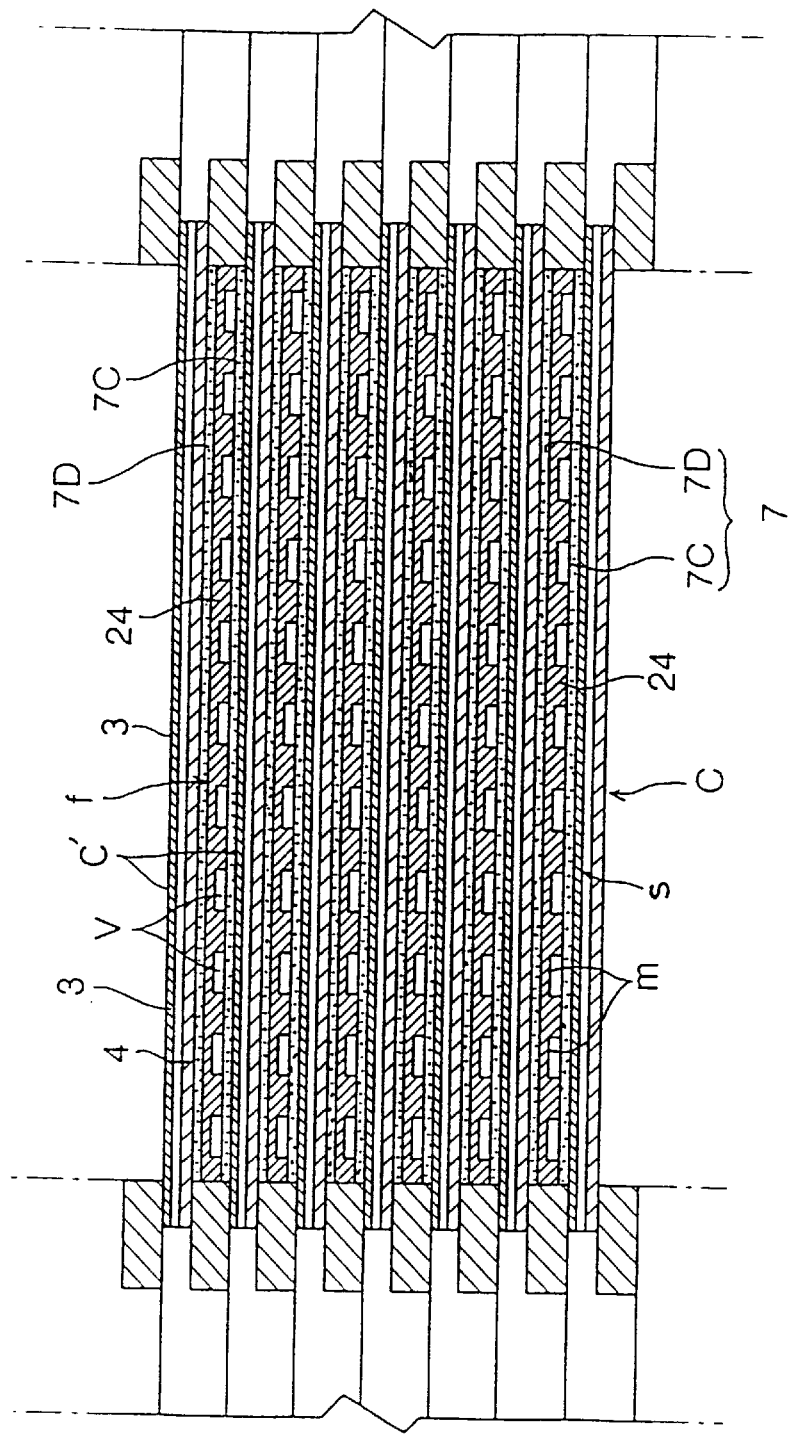
FIG. 8 is a side view in vertical section showing principal portions of a stacked cell assembly relating to a second embodiment.
Figure 9:
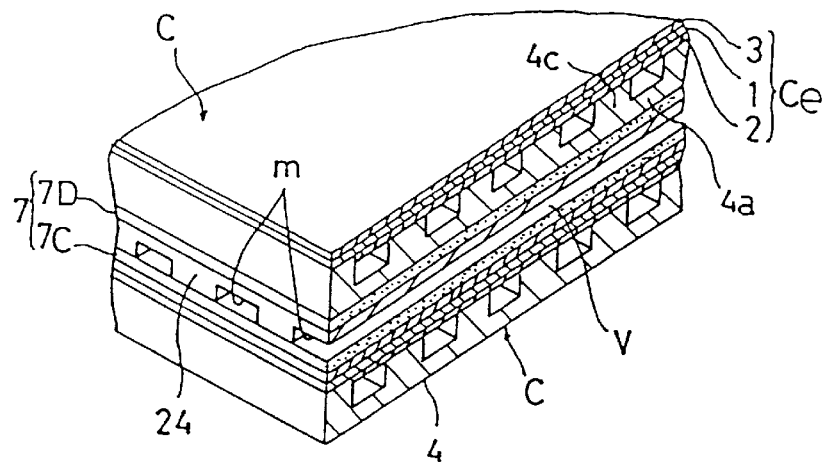
FIG. 9 is a perspective view in vertical section showing principal portions of the stacked cell assembly relating to the second embodiment.
Figure 10:
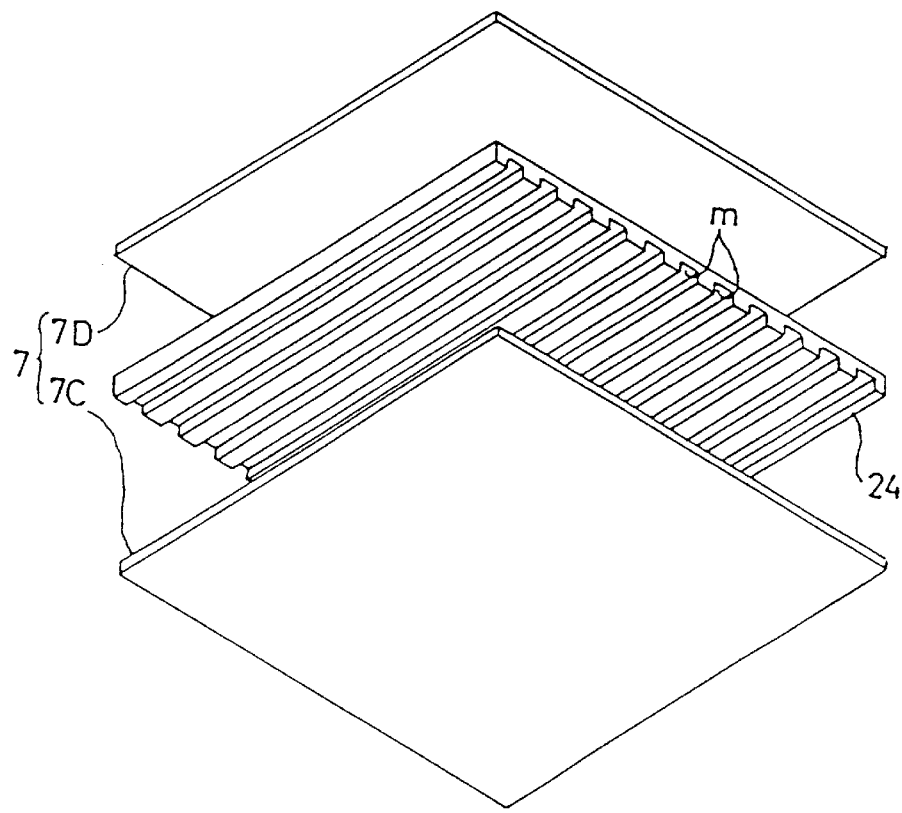
FIG. 10 is a perspective view showing constructions of a conductive member and a vacant forming member relating to the second embodiment.

Next, with reference to FIGS. 8 through 10, a second embodiment of the present invention will be described.

In this second embodiment, the construction for providing the vacant portion V in the charged space charged with the conductive member 7 differs from that of the first embodiment. Yet, the other constructions, i.e. the construction of the cell Ce, the construction of the separator-attached cell C, the construction of the stacked cell assembly, the construction for obtaining electric power from the stacked cell assembly, and the general construction of the fuel cell are all the same as those of the first embodiment. Therefore, description and illustration of these identical constructions will be avoided.

In this second embodiment, the conductive member 7 is divided into two portions, i.e. a cell-side portion 7C contacting the fuel electrode 3 and passage-forming-member-side portion 7D contacting the conductive separator 4; and between these cell-side portion 7C and the passage-forming-member-side portion 7D of the conductive member 7, there is interposed a vacant forming member 24 having a dense structure and electric conductivity and forming a vacant portion V opened to the cell-side portion 7C.

Then, the adjacent cells Ce are conductively connected with each other, via the conductive separator 4, the passage-forming-member-side portion 7D of the conductive member 7, the vacant forming member 24 and the cell-side portion 7C of the conductive member 7.

Each of the cell-side portion 7C and the passage-forming-member-side portion 7D of the conductive member 7 is provided as a rectangular plate having an identical planar configuration.

The vacant forming member 24 is provided as a rectangular plate member having a planar configuration identical to that of the cell-side portion 7C of the conductive member 7, and also this member 24 defines, on the rectangular side thereof contacting the cell-side portion 7C of the conductive member 7, a plurality of straight linear grooves (m) functioning together as the vacant portion V.

The vacant forming member 24 is formed of Ni.

Further, the felt-like Ni material forming cell-side portion 7C of the conductive member 7 has a smaller density than the felt-like Ni material forming the passage-forming-member-side portion 7D. That is to say, like the first embodiment, in the conductive member 7, a portion thereof contacting the fuel electrode 3 has a greater aperture ratio than the other portion thereof in the direction of cross section along the cell stacking direction.

OTHER EMBODIMENTS

Next, other embodiments of the invention will be described specifically.

(1) In case the conductive member 7 is divided in the cell stacking direction in order to provide this conductive member with portions for forming the vacant portion V by placing the divided portions one on the other, the manner of dividing the conductive member 7 in the cell stacking direction may vary in many ways, in addition to the one described in the first embodiment.

For instance, the first conductive member 7A of the first embodiment may be further divided into a plate-like portion 7a and a plurality of ridges 7b.

Further, the conductive member may be divided into two portions each having recesses for forming the vacant portion V. Then, as these two divided portions are placed one on the other, the recesses of the respective portions are also overlapped with each other to form the vacant portion V.

(2) In the first embodiment, the first conductive member 7A includes the plate-like portion 7a and the plurality of ridges 7b formed on one side of the plate-like portion 7a, thus forming the recesses (v) which together form the vacant portion V.

Instead, the first conductive member 7A may include the plate-like portion 7a and a plurality of projections in the form of cylinders or prisms, thus forming the recesses (v) which together form the vacant portion V.

(3) In the first embodiment, the conductive member 7 is divided in the cell stacking direction. Instead, the conductive member 7 may be provided as one integral member. In this case, a plurality of tunnel-like holes will be formed in this integral conductive member 7, so that these tunnel-like holes function as the vacant portion V.

(4) The specific construction of the vacant forming member 24 may vary in many other ways than the one described in the second embodiment.

The recesses for forming the vacant portion V may be realized by forming a number of cylindrical or prism-like projections on one side of the plate-like portion.

Further alternatively, the vacant portion V may be formed of a plurality of prisms disposed with a predetermined distance therebetween. In this case, the vacant portion V will be opened to both the cell-side portion 7C and the passage-forming-member-side portion 7D.

(5) In the foregoing respective embodiments, the elongate vacant portion V is provided in the form of straight linear portion. Instead, the elongate vacant portion V may be curved or formed in the shape of a meandering line.

(6) In the foregoing embodiments, the vacant portion V has the rectangular opening in the direction of cross section along the cell stacking direction. However, the shape of the opening of the vacant portion V may vary in many ways, for instance, it may be round or oval.

(7) In the foregoing respective embodiments, the number of the vacant portions V provided in the conductive member 7 may vary conveniently. For instance, only one vacant portion V may be provided.

(8) In the foregoing respective embodiments, the conductive member 7 is formed of Ni felt-like material. Instead, any other felt-like material than Ni may be employed.

Further, in the foregoing embodiments, the conductive felt-like material was described as the specific material for forming the conductive member 7. However, any other kind of material may be employed. For instance, sponge-like material having electric conductivity may be used.

(9) In the foregoing embodiments, in the conductive member 7, a portion thereof contacting the fuel electrode 3 has a greater aperture ratio than the other portion thereof in the direction of cross section along the cell stacking direction. Instead, the aperture ratio in the cross section direction may be uniform.

(10) In the foregoing embodiments, the conductive member 7 is charged only between the passage forming member 4 and the fuel electrode 3. Instead, the conductive member 7 may be charged between the passage forming member 4 and the oxygen electrode 2 as well.

(11) In the foregoing respective embodiments, in addition to the conductive member 4, the conductive felt-like member 12 too may be provided with the vacant portion V.

(12) The stacking construction in which a plurality of cells Ce are stacked via the passage forming member 4 interposed between the adjacent ones, with a side thereof facing the oxygen electrode 2 forming the oxygen-containing gas passages (s) and the other side thereof facing the fuel electrode 3 forming the fuel gas passages (f) is not limited to those described and illustrated in the foregoing embodiments. This stacking construction may vary in many ways.

(13) In the foregoing respective embodiments, the separator-attached cell Ce is constructed by attaching the conductive separator 4 to form the oxygen-containing gas passages (s) on the side of the cell Ce facing the oxygen electrode 2. Instead, the separator-attached cell Ce may be constructed by attaching the conductive separator 4 to form the fuel gas passages (f) on the side of the cell Ce facing the fuel electrode 3. In this case, the conductive member 7 will be charged between the conductive separator 4 and the oxygen electrode 2. Therefore, this conductive member 7 should be formed of material having good resistance against oxidation.

THIRD EMBODIMENT

First, reference will be made briefly to FIG. 20.

Figure 20:
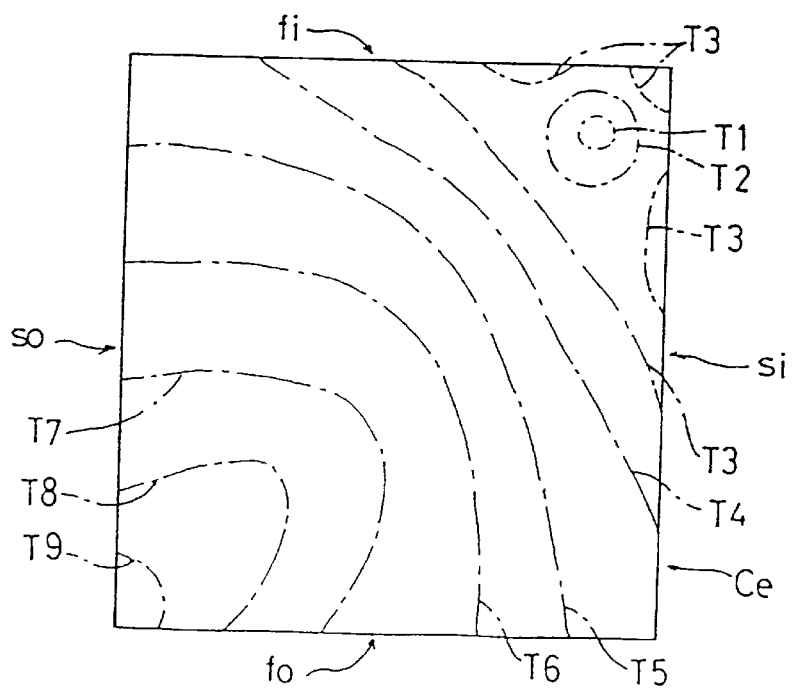
FIG. 20 is a view showing temperature distribution of a conventional fuel cell in the direction of plane of three-layer plate.
Figure 21:
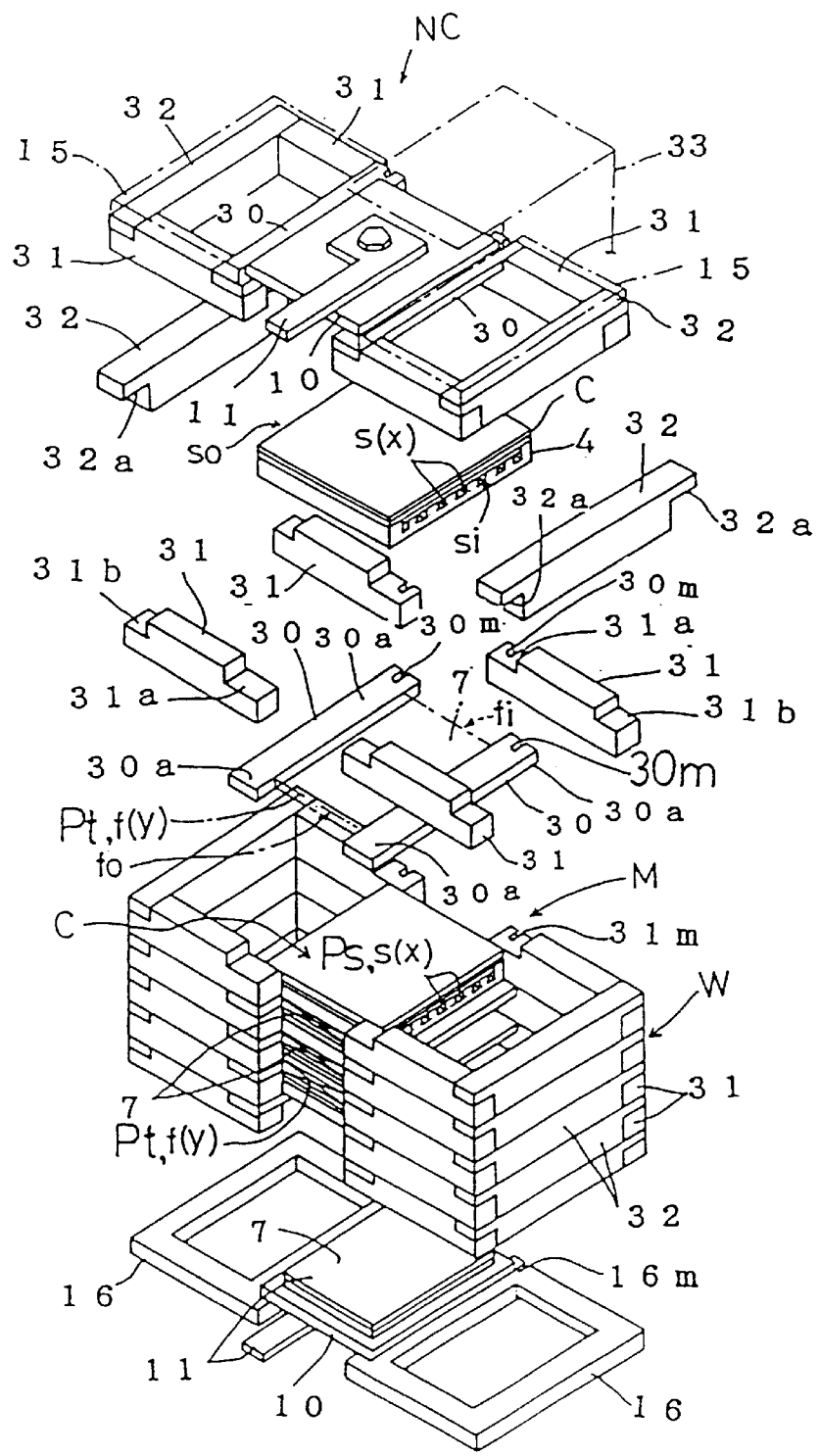
FIG. 21 is an exploded perspective view showing a construction of a stacked cell assembly of a fuel cell.
Figure 22:
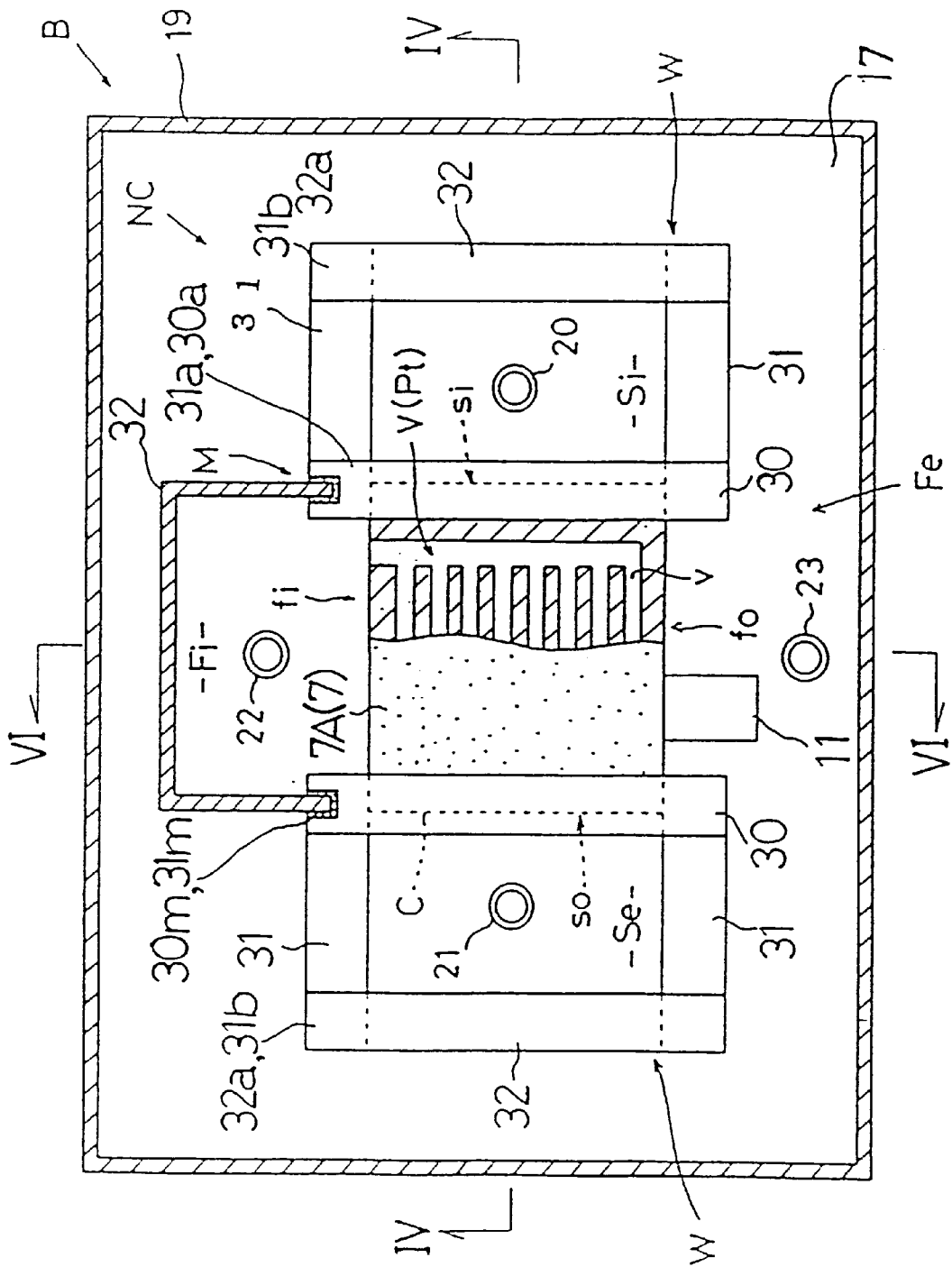
FIG. 22 is a plan view in horizontal section showing an entire construction of a fuel cell.
Figure 23:
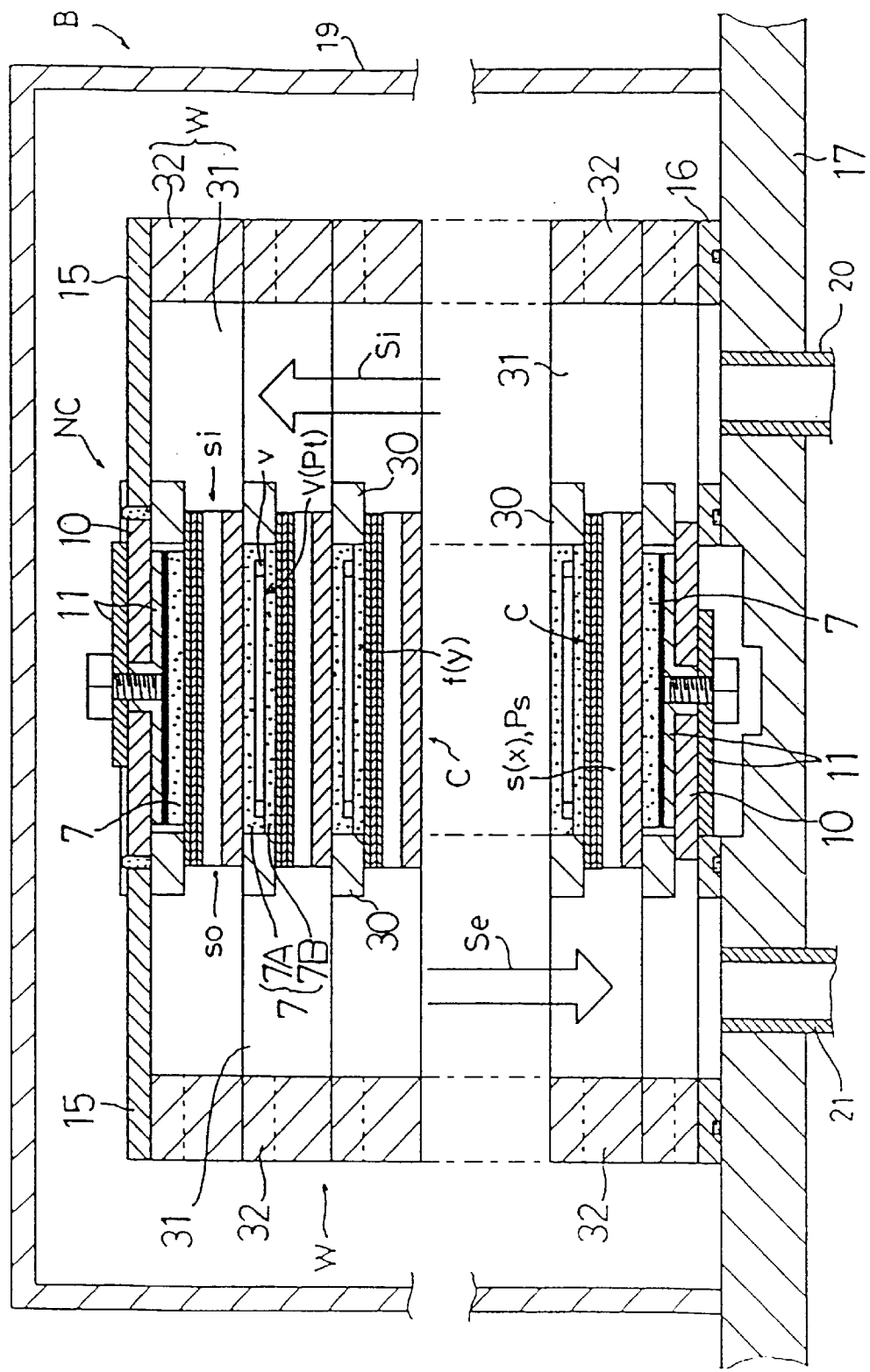
FIG. 23 is a section taken along a line IV—IV in FIG. 22.
Figure 24:
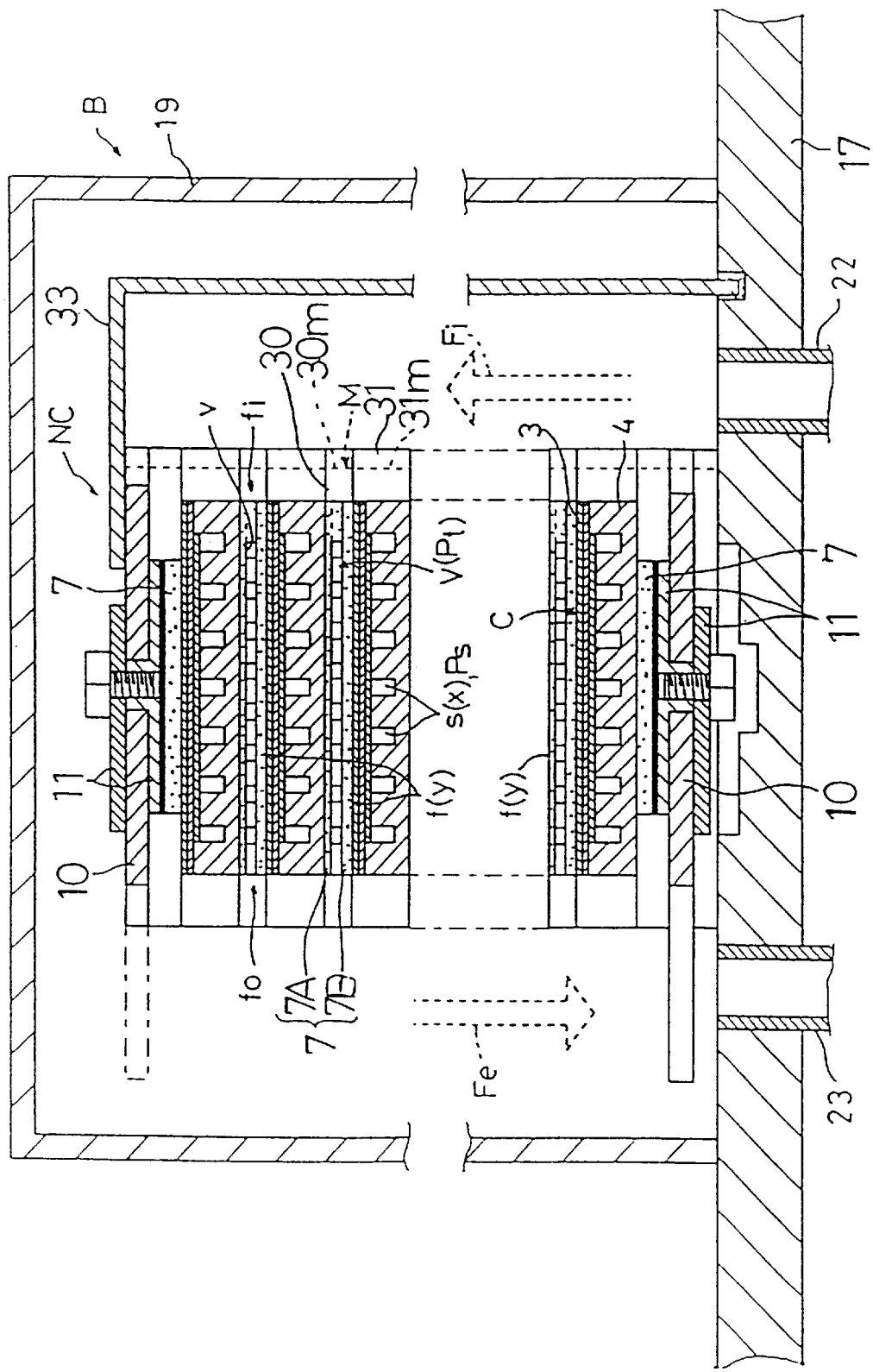
FIG. 24 is a section taken along a line VI—VI in FIG. 22.

As shown in FIG. 20, in the case of a conventional fuel cell construction, in temperature distribution in the direction of the face of the three-layer cell C, in general, the temperature is higher on the side of the corner formed by the end edge where the supply openings f1 of the fuel gas passages are located and the further end edge where the exhaust openings Si of the oxygen-containing gas passages are located. And, the temperature is lower toward the corner formed by the end edge where the exhaust openings fo of the fuel gas passages and the further end edge where the exhaust openings so of the oxygen-containing gas passages (s) are located. In this way, the temperature distribution is complicated and there is developed a large temperature difference in the direction of the face of the cell Ce. Incidentally, in FIG. 20, marks, $T_1$, $T_2$, $T_3$ . . . $T_9$ denote isothermal lines, with the greater the numeral attached thereto, the lower the temperature.

Incidentally, if the flow amount of the fuel gas or oxygen-containing gas increases, heat generated by reaction of the electrode may sometimes be transferred to the downstream side. In this case, the temperature will be higher on the side of the exhaust opening. In any case, however, in the direction of the face of the three-layer plate, the direction where the temperature varies due to the fuel gas and the direction where the temperature varies due to the oxygen-containing gas extend normal to each other. Hence, the temperature distribution on the face of the three-layer plate is complicated and there is developed a significant temperature difference on the face.

If there is developed such significant temperature difference in the direction of the face of the three-layer plate, this will tend to cause internal stress in the three-layer plate. On the other hand, as the output of the fuel cell is increased, the amount of electrode reaction is also increased. Then, in the case of the conventional fuel cell, as the internal stress of the fuel cell is increased in association with increase of the output of the fuel cell, such increase of output may cause deterioration of the durability of the fuel cell.

Therefore, conventionally, there is a limit in increasing the output of the fuel cell, in the respect of its durability. And, the conventional fuel cell has room for improvement in increase of its output.

Then, the constructions according to this third embodiment and fourth and fifth embodiments to follow are capable of solving this problem of the conventional art.

Now, with reference to FIGS. 11 through 17, the third embodiment of the present invention will be described.

A plurality of rectangular solid electrolyte layers 1 each having an oxygen electrode 2 on one side and a fuel electrode 3 on the other side are stacked with a predetermined distance therebetween in the direction of thickness, with a conductive separator 4, as a passage forming member, interposed between the adjacent layers 1, so as to form oxygen-containing gas passages (s) on the side facing the oxygen electrode 1 and fuel gas passages (f) on the other side facing the fuel electrode 3. With this, a stacked cell assembly NC is formed.

Supply openings si and exhaust openings so of the oxygen-containing gas passages (s) are provided respectively at the pair of opposed end edges of the solid electrolyte layer 1; and supply openings fi and exhaust openings fo of the fuel gas passages (f) are provided respectively at the further pair of opposed end edges of the solid electrolyte layer 1. Also, a flexible conductive member 7 adapted for allowing gas passage therethrough is charged into the space between the conductive separator 4 and the fuel electrode 3.

In the present invention, in the space charged with the flexible conductive member 7 between the conductive separator 4 and the fuel electrode 3, at a position spaced from the fuel electrode 3 relative to the disposing direction of the solid electrolyte layers 1, there is provided a temperature-difference restricting flow portion P having a lower gas flow resistance than the flexible conductive member 7 and adapted for circulating the fuel gas or oxygen-containing gas so as to restrict development of temperature difference in the direction of the face of the solid electrolyte layer 1.

First, with reference to FIG. 11, the cell C of the fuel cell will be described in greater details.

The construction of this cell C is identical to that shown in FIG. 1.

In this embodiment, inner-cell passages (x) function as the oxygen-containing gas passages (s).

Incidentally, one of the pair of end openings of the oxygen-containing gas passage (s) is used as a supply opening si for the oxygen-containing gas and the other is used as an exhaust opening so for the oxygen-containing gas, respectively.

Incidentally, in each oxygen-containing gas passage (s), the oxygen-containing gas flows straight from the supply opening si to the exhaust opening so along the entire width of the passage in the direction along the opening end edge of the cell C.

Incidentally, in the following description, in the cell C, the end edge where the end openings of the oxygen-containing gas passages (s) are located will be referred to briefly as the opened end edge and the end face where the oxygen-containing gas passages (s) are closed will be referred to as the closed end face, respectively.

Next, with reference to FIGS. 12 through 15, there will be described the construction for forming the stacked cell assembly NC by stacking the plurality of cells C with a predetermined distance therebetween in the direction of thickness thereof so as to form inter-cell passages (y) functioning as the fuel gas passages between the adjacent cells.

The cells C are disposed in the thickness direction with the distance therebetween retained by means of a pair of distance retaining members 30 provided adjacent the respective opened end edges, and between the cells adjacent each other in the cell stacking direction (corresponding to the disposing direction of the solid electrolyte layers 1), the flexible conductive member 7 is charged so as to allow gas passage therethrough. Then, via this flexible conductive member 7, the cells C adjacent in the cell stacking direction are electrically conductively connected with each other.

As the opposed side of the adjacent cells C are partitioned by the pair of distance retaining members 30, fuel gas passages (f) are formed between these cells adjacent each other in the cell stacking direction. The fuel gas passages (f) are closed on the both opened end edges of the cell C by the pair of distance retaining members 30 and are opened on the both closed end faces of the cell C.

Incidentally, one of the pair of end openings of the fuel gas passage (f) is used as the fuel gas supply opening fi while the other is used as a fuel gas exhaust opening fo, respectively.

Accordingly, the supply opening si and the exhaust opening so of the oxygen-containing gas passage (s) are provided respectively at the pair of opposed end edges of the solid electrolyte layer 1 and the supply opening fi and the exhaust opening fo of the fuel gas passage (f) are provided respectively at the further pair of the opposed end edges.

Next, the flexible conductive member 7 will be described in greater details.

Figure 16:
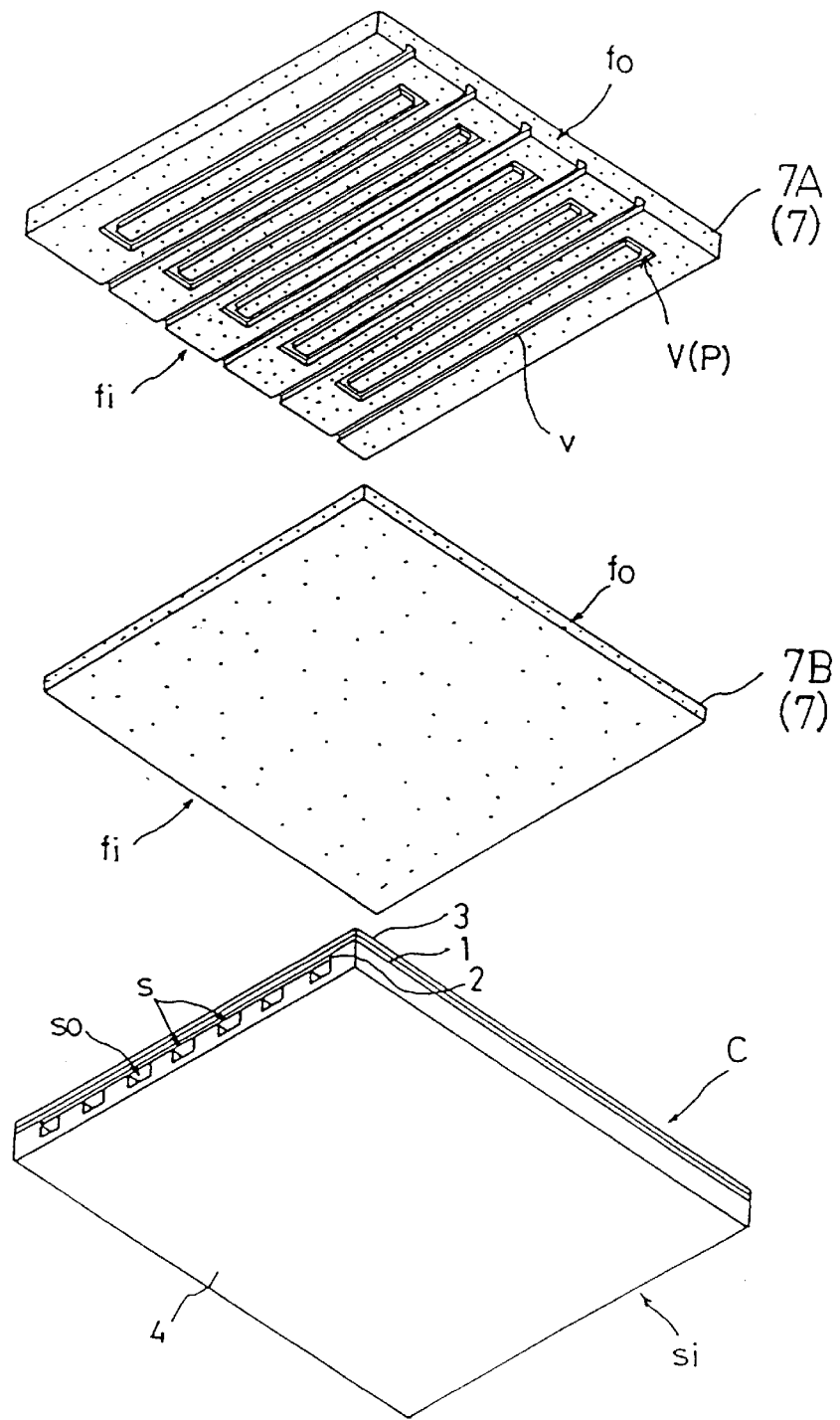
FIG. 16 is an exploded perspective view showing a construction of a flexible conductive member relating to the first embodiment of the invention.

As shown also in FIGS. 16 and 17, the temperature-difference restricting flow portion P provided to the flexible conductive member 7 is constructed so as to flow the fuel gas fed through the supply opening fi to make turns in its flowing direction before the exhaust opening fo and before the supply opening fi thus flowing the gas back and forth between the supply opening fi and the exhaust opening fo, and then to discharge this gas through the exhaust opening fo.

The temperature-difference restricting flow portion P is realized by providing the vacant portion V at the portion of the flexible conductive member 7 corresponding to an intermediate portion in the cell stacking direction.

The flexible conductive member 7 is divided into two portions in the cell stacking direction, i.e. a first conductive member 7A having, in one side thereof, recesses (v) forming the vacant portion (V) and a second conductive member 7B to be laid over the first conductive member 7A for closing the recesses (v). Then, as the first conductive member 7A and the second conductive member 7B are placed one on the other with the second conductive member 7B closing the recesses (v) of the first conductive member 7A, the vacant portion V is formed. That is to say, the recesses (v) of the first conductive member 7A and the face of the second conductive member 7B on the side of the first conductive member 7A function respectively as vacant forming portions.

The first conductive member 7A is formed by press-forming felt-like Ni material on a rectangular plate having a substantially same area as the cell C so as to form the recesses (v) on one side of the plate.

Referring to the recess (v), its one end is opened on the end face having the supply openings fi of the fuel gas passages (f) and then the recess extends straight toward the exhaust opening fo of the fuel gas passage (f) and then makes a turn before the exhaust opening fo and extends further straight toward the supply opening fi, makes a turn again before the supply opening fi, extends further straight toward the exhaust opening fo, and finally, the other end of the recess reaches the end face having the exhaust opening fo. In this manner, the recess is formed as a meandering recess. And, total five of the meandering recesses (v) are formed side by side along the closing end edge of the cell C.

The second conductive member 7B is formed by pressing felt-like material of Ni on one side of a rectangular plate having an area substantially equal to that of the first conductive member 7A.

Next, the distance retaining member 30 will be described in greater details. This distance retaining member 20 is provided in the form of a plate having a length longer than the length of the opened end edge of the cell C.

Then, each of the pair of distance retaining members 30 is disposed along the opened end edge of the cell C, with opposed ends of the member projecting from the closed end faces of the cell C, thereby to retain the distance between the cells C.

Further, by connecting a frame forming member W with each distance retaining member 30, there are formed two passages which are continuously connected with each other in the cell stacking direction and communicated with the respective oxygen-containing gas passages (s) and the respective end opening. And, the one passage facing the end opening used as the supply opening si is utilized as the supply oxygen gas passage Si for supplying the oxygen-containing gas to the respective oxygen-containing gas passage (s) and the other passage facing the end opening used as the exhaust opening so is utilized as the exhaust oxygen gas passage Se for exhausting the oxygen-containing gas from the respective oxygen-containing gas passage (s).

Next, the frame forming member W will be described in greater details.

This frame forming member W includes a pair of first prism-like members 31 connected respectively with projecting ends 30a of the distance retaining member 30 projecting from the closed end faces of the cell C and a second prism-like member 32 for interconnecting the ends of the pair of first prism-like members 31.

Each of the first prism-like members 31 and the second prism-like member 32 has a thickness, in the cell stacking direction, equal to the sum of the thickness of the cell C and the thickness of the distance retaining member 30.

At one end of each first prism-like member 31, there is formed a recess 31a having a same depth as the thickness of the distance retaining member 30 so as to allow insertion of the projecting end 30a of the distance retaining member 30. Accordingly, the remaining thin portion of the first prism-like member 31 realized by forming the recess 31a in the first prism-like member 31 has a thickness equal to the thickness of the cell C.

At the other end of each first prism-like member 31, there is formed a recess 31b, and at each of opposed ends of the second prism-like member 32, there is formed a recess 32a for allowing insertion of the recess 31b of the first prism-like member 31.

When the first prism-like member 31 is connected with the projecting end 30a of the distance retaining member 30, the side face of the first prism-like member 31 is brought into tight contact with the closed end face of the cell C, thereby gas-tightly partitioning the end opening of the oxygen-containing gas passage (s) from the end opening of the fuel gas passage (f).

Further, at one end of each distance retaining member 30, a groove 30m is formed, and each first prism-like member 31 defines, in a side thereof, a groove 31m which is overlapped with the groove 30m of the distance retaining member 30. Then, as these grooves 30m and 31m are connected continuously in the cell stacking direction, there are formed a pair of grooves M into which side edges of a gas passage forming member 12 (described later) are fitted.

Each of the distance retaining members 30, the first prism-like members 31 and the second prism-like member 32 is formed of ceramic material having electric insulating property as well as good heat resistance, oxidation resistance and reduction resistance.

Next, with reference to FIGS. 12 through 15, a construction for obtaining electric power from the stacked cell assembly NC will be described.

The flexible conductive members 7 are disposed in contact with the cells C on the opposed ends in the cell stacking direction of the stacked cell assembly NC. Further, the collector portion 11 supported to the collector support member 10 is disposed in contact with the flexible conductive member 7, so that electric power is obtained via the collector portion 11.

More particularly, the collector portion support member 10 to which the collector portion 11 is supported is supported to the stacked cell assembly NC by means of the distance retaining member 30 and the frame forming member W, as is the case with the cell C.

Next, the general construction of the fuel cell will be described with reference to FIGS. 12 through 15.

On the base mount 17, there are mounted a pair of frame members 16 having a same frame shape as the frame formed by the distance retaining member 30 and the frame forming member W. Then, the stacked cell assembly NC is mounted on the pair of frame forming members 16 with the openings of the frame formed by the distance retaining members 30 and the frame forming member W being registered with the opening of the frame member 16.

The frame member 16 too defines a recess 16m for forming a groove M.

And, a gas passage forming member 33 having three sides and a top side is disposed with its opposed side edges being fitted into the opposed grooves M, so that the end opening used as the supply opening fi forms therein a space communicated with the respective fuel gas passage (f), and this space is used as the supply fuel gas passage Fi for supplying the fuel gas to the respective fuel gas passage (f).

A lid member 18 is provided so as to close the opening formed by the distance retaining members 30 and the frame forming member W on the top end of the stacked cell assembly NC, whereby the supply oxygen gas passage Si and the exhaust oxygen gas passage Se are closed.

Further, a bottomed prism-like body 19 accommodating therein the stacked cell assembly NC is mounted on the base mount 17. That is to say, the base mount 17 and the bottomed prism-like body 19 together constitute a box body B and the stacked cell assembly NC is disposed inside this box body B.

Of the pair of opened ends of the fuel gas passage (f) of each cell C, one end opening used as the exhaust opening fo for the fuel gas is exposed to the inside of the box body B.

Then, the inner space of the box-like body B is used as the exhaust fuel gas passage Fe for exhausting the fuel gas from the respective fuel passage (f).

The supply oxygen gas passage Si is communicated via the base amount 17 with an oxygen-containing gas supply pipe 20 and the exhaust oxygen gas passage Se is communicated via the base mount 17 with a fuel gas supply passage 22, respectively.

The oxygen-containing gas supplied from the oxygen-containing gas supply pipe 20 into the supply oxygen gas passage Si flows through the supply opening si into the respective oxygen-containing gas passage (s), runs through this passage (s), flows out of the respective exhaust opening so into the exhaust oxygen gas passage Se, and this gas is exhausted through the oxygen-containing gas exhaust pipe 21.

On the other hand, the fuel gas supplied from the fuel gas supply pipe 22 into the supply fuel gas passage Fi flows through the supply opening fi into the respective fuel gas passage (f) and runs through this passage (f), then flows through the exhaust opening fo into the exhaust fuel gas passage Fe, and this gas is then exhausted through the fuel gas exhaust pipe 23.

Next, with reference to FIG. 17, a flow condition of the oxygen-containing gas in the oxygen-containing gas passage (s) and a flow condition of the fuel gas in the fuel gas passage (f) will be described.

Figure 17A:
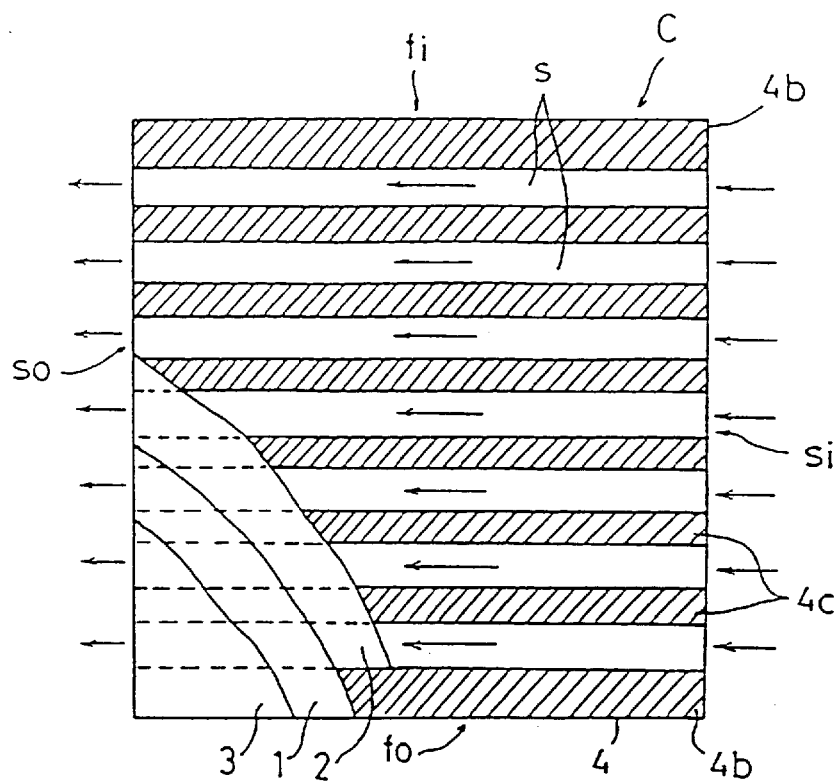
FIG. 17(a) and FIG. 17(b) are views illustrating gas flow conditions of oxygen-containing gas and fuel gas relating to the first embodiment of the invention.
Figure 17B:
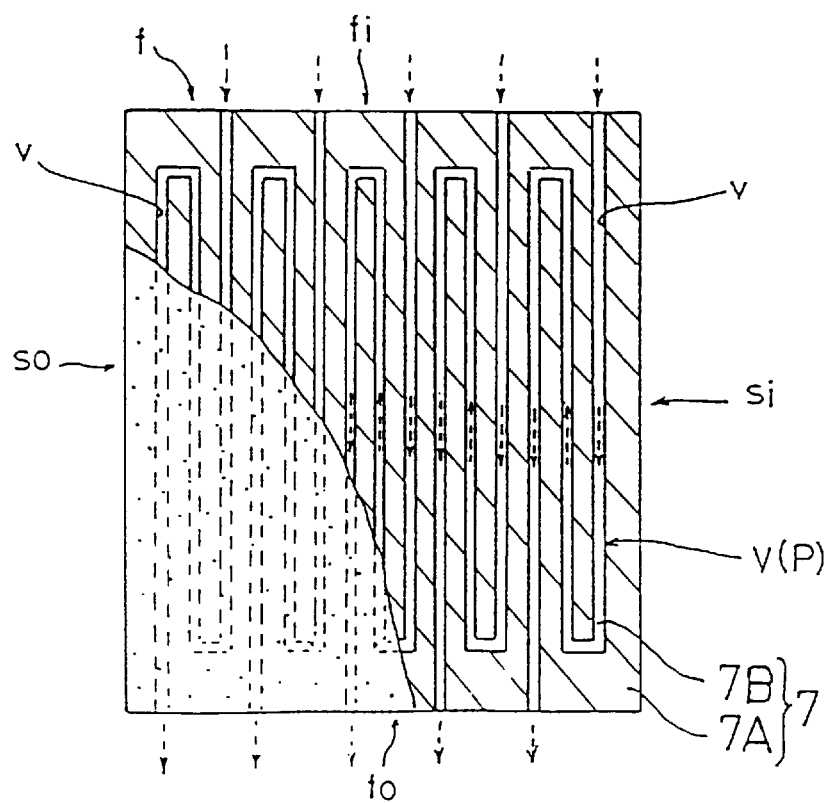

Incidentally, in FIG. 17(a), the cell C is shown in a partially cutaway condition in the face direction at an intermediate portion of the conductive separator 4 in the cell stacking direction. Also, in FIG. 17(b), the flexible conductive member 7 is shown in a partially cutaway condition in the face direction at an intermediate portion of the first conductive member 7A in the cell stacking direction. In FIG. 17, the flow of the oxygen-containing gas is denoted with solid lines and the flow of the fuel gas is denoted with broken lines.

As shown in FIG. 17(a), the oxygen-containing gas flows straight in the oxygen-containing gas passage (s) along the entire width of this passage from the supply opening si to the exhaust opening so.

On the other hand, the fuel gas supplied through the supply opening fi flows as being guided by each meandering vacant portion V back and forth for 1.5 times between the supply opening fi and the exhaust opening fo. Then, the fuel gas is discharged through the exhaust opening fo. The fuel gas flowing inside the vacant portion V is diffused as permeating the flexible conductive member 7 and comes into contact with the entire area of the fuel electrode 2.

During the process in which the fuel gas flows through the vacant portion V, hydrogen present in the fuel gas causes an electrode reaction. Therefore, the content of the hydrogen present in the fuel gas passing the vacant portion gradually decreases from the first forward passage portion, the reverse passage portion and the last forward passage portion. Thus, for the fuel electrode, in the direction extending normal to the direction interconnecting the supply opening fi and the exhaust opening fo, the fuel gas is supplied through the cooperation of the first forward passage portion, the reverse passage portion and the last forward passage portion of the vacant portion V. Therefore, the electrode reaction takes place uniformly over the entire area of the fuel electrode 2.

FOURTH EMBODIMENT

Figure 18:
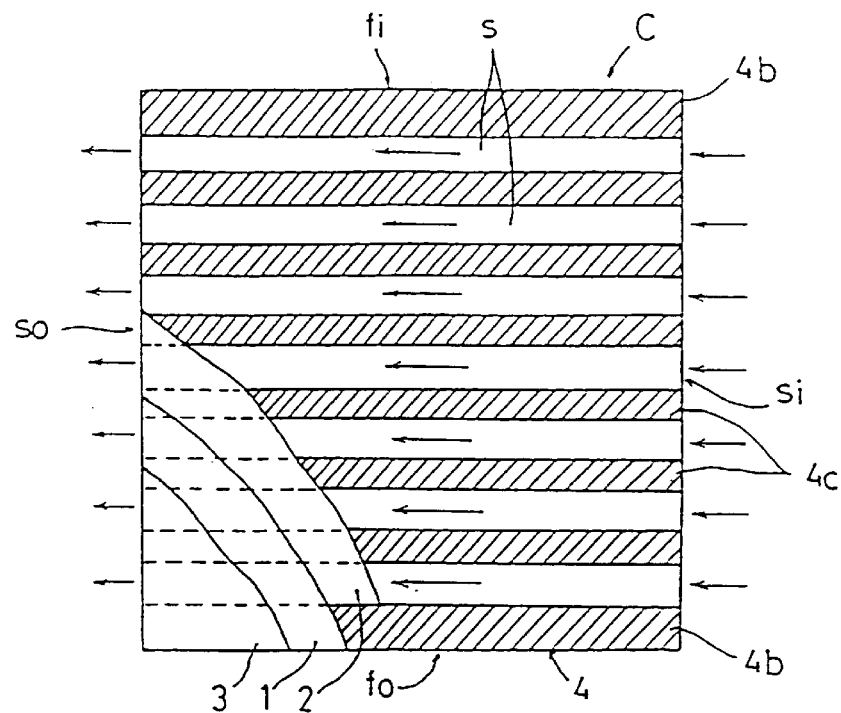
FIG. 18(a) and FIG. 18(b) are views illustrating gas flow conditions of oxygen-containing gas and fuel gas relating to the second embodiment of the invention.
Figure 18:
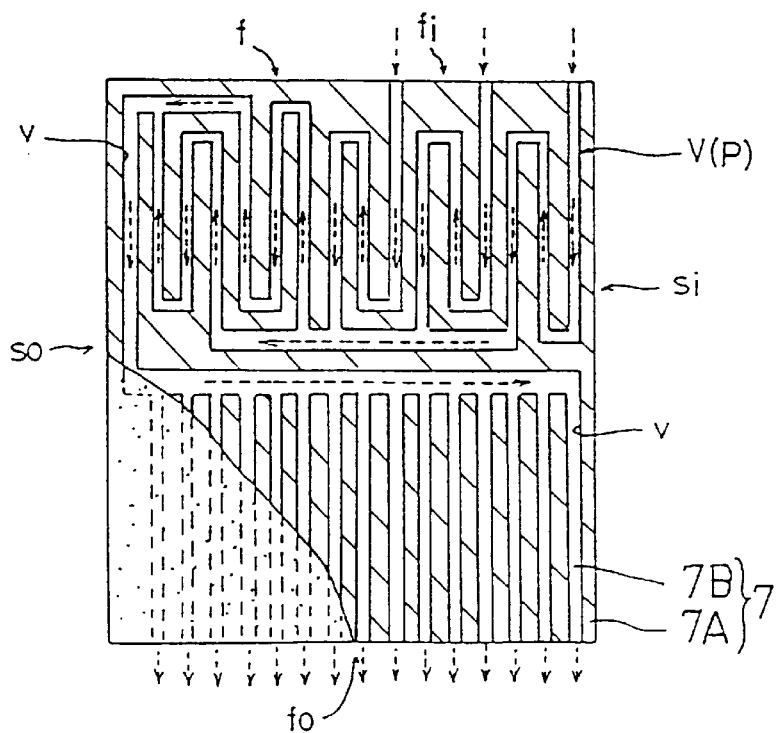

Next, a fourth embodiment of the invention will be described with reference to FIG. 18.

In this fourth embodiment, except for the flexible conductive member 7, the same constructions as those of the third embodiment are employed. Therefore, only the flexible conductive portion 7 will be described next.

As shown in FIG. 18(b), a temperature-difference restricting portion P provided in the flexible conductive member 7 is constructed so as to cause the fuel gas to flow in a concentrated manner through a portion in the cell stacking direction of the fuel gas passage (f) and to cause this gas to then flow through the other portion.

That is to say, in the case of the conventional fuel cell, when there is developed such temperature distribution as shown in FIG. 20, the highest temperature portion is formed adjacent the corner formed by the end edge where the supply opening fi of the fuel gas passage (f) is located and the further end edge where the supply opening si of the oxygen-containing gas passage (s) is located, and within an area corresponding to about ¼ of the entire area.

Then, the above local area is located at the portion overlapped with the highest temperature portion in the cell stacking direction, so that a modifying reaction of the hydrocarbon type gas may take place in a concentrated manner at this particular area thereby to reduce the temperature of this area by its heat absorbing effect.

That is, as shown in FIG. 18(b), an arrangement is made such that the fuel gas is caused to flow, from the portion on the side of the supply opening si of the oxygen-containing gas passage (s), into the fuel gas passage (s) and then to flow through a following path in the fuel gas passage and then to be discharged through the exhaust opening fo.

First, the fuel gas is caused to flow in a concentrated manner adjacent the corner formed by the end edge where the supply opening fi of the fuel gas passage (f) is located and the further end edge where the supply opening si of the oxygen-containing gas passage (s) is located and at the limited area corresponding to about ¼ of the entire area (this area corresponding to the above-described one area) and to flow along the meandering path at this area, so that the modifying reaction of the hydrocarbon type gas may take place at this limited area. Subsequently, the fuel gas is caused to flow in a concentrated manner adjacent the further corner formed by the end edge where the supply opening fi of the fuel gas passage (f) is located and the further end edge where the exhaust opening so of the oxygen-containing gas (s) is located and at the further limited area corresponding to about another ¼ of the entire area. Next, the fuel gas is caused to flow through the remaining ½ area portion over the substantially entire width between the end edge where the supply opening si of the oxygen-containing gas passage (s) is located and the end edge where the exhaust opening so is located straight toward the exhaust opening fo.

Incidentally, Ni present in the cermet constituting the fuel electrode functions as a modifying catalyst for modifying the hydrocarbon type gas into gas containing hydrogen gas.

The temperature-difference restricting flow portion P, like the first embodiment, is realized by providing the vacant portion V at a portion in the flexible conductive member 7 corresponding to an intermediate portion in the cell stacking direction.

Further, also like the first embodiment, the flexible conductive member 7 is divided into two portions in the cell stacking direction, consisting of the first conductive member 7A having the recesses (v) for forming the vacant portion V in one side thereof and the second conductive member 7B which is to be overlapped with the first conductive member 7A for closing the recesses (v). Then, as the first conductive member 7A and the second conductive member 7B are overlapped with each other, the recesses (v) of the first conductive member 7A are closed by the second conductive member 7B, thus forming the vacant portion V.

OTHER EMBODIMENTS

Some other embodiments of the invention will be specifically described next.

(1) The shape of the temperature-difference restricting flow portion P is not limited to those described in the foregoing embodiments. The shape may be modified in many ways that can restrict the temperature difference in the face direction of the electrolyte layer 1.

Figure 19:
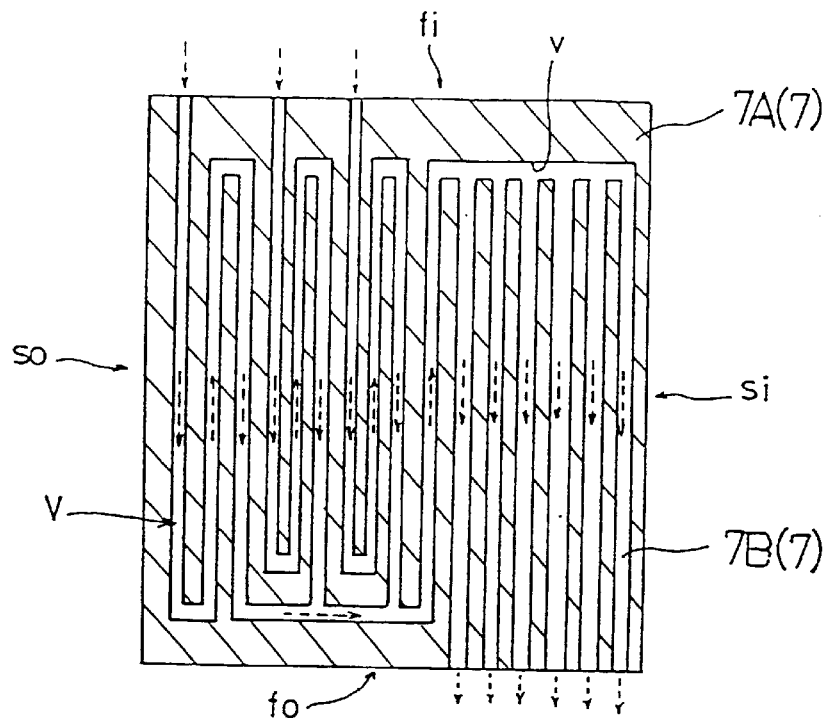
FIG. 19 is a plan view showing a construction of a flexible conductive member employed in a fuel cell relating to a further embodiment.

For instance, like the foregoing embodiments, the oxygen-containing gas passage (s) may be formed so as to flow the oxygen-containing gas straight or substantially straight over the entire width of the flow passage extending along the end edge of the electrolyte layer 1 from the supply opening si to the exhaust opening so, and a temperature-difference restricting flow portion P having a passage shape as shown in FIG. 19 may be provided in the flexible conductive member 7 charged between the conductive separator 4 and the fuel electrode 3.

That is to say, the fuel gas is caused to enter the fuel gas passage (f) from a portion on the side of the exhaust opening so of the oxygen-containing gas passage (s) at the supply opening fi of the fuel gas passage (f), then to flow, in the face direction of the cell C, through the portion of the oxygen-containing gas passage (s) on the side of the exhaust opening so and then through the further portion of the oxygen-containing gas passage (s) on the side of the supply opening si.

In this case, in the face direction of the cell C, fuel gas high in hydrogen content runs through the portion where oxygen-containing gas low in oxygen content runs, whereas fuel gas low in hydrogen content runs through the portion where oxygen-containing gas high in oxygen content runs. Accordingly, the temperature difference in the face direction of the cell C may be restricted.

(2) In the first embodiment, the temperature-difference restricting flow portion P is constructed such that the fuel gas is caused to run back and forth for 1.5 times between the exhaust opening fo and the supply opening si. Instead, this flow portion P may be constructed such that the fuel gas is caused to run back and forth between the same for 2.5 times.

Further, in the foregoing embodiment, total five of the temperature-difference restricting flow portions P are provided side by side along the closed end edge of the cell C. However, the total number of the temperature-difference restricting flow portion P may vary conveniently, the number may be fewer than four or greater than six.

(3) In the foregoing embodiment, in the temperature-difference restricting flow portion P, the plurality of passage portions disposed side by side along the direction interconnecting the supply opening si and the exhaust opening so of the oxygen-containing gas passage (s) all have the same passage cross-section area. Instead, the passage portions may have increasing cross-section areas toward the exhaust opening so.

In this case, in the face direction of the cell S, at the portion where the oxygen-containing gas low in oxygen content runs, the amount of fuel gas running through the temperature-difference restricting flow portion P is large, so that there occurs small amount of reduction in the content of the hydrogen in the fuel gas. On the other hand, at the further portion where the oxygen-containing gas high in oxygen content runs, the amount of fuel gas running through the temperature-difference restricting flow portion P is small, so that there occurs large reduction in the content of the hydrogen in the fuel gas. Accordingly, the temperature difference in the face direction of the cell C may be further restricted.

(4) In the foregoing respective embodiments, the temperature-difference restricting flow portion P is provided at the intermediate portion of the flexible conductive member 7 in the cell stacking direction. Instead, the restricting flow portion P may be provided at the face portion of the flexible conductive member 7 contacting the conductive separator 4.

(5) In the foregoing respective embodiments, the temperature-difference restricting flow portion P is realized by providing the vacant portion V in the flexible conductive member 7. Instead, this portion P may be realized by providing the flexible conductive member 7 with a gas-permeable element having lower resistance against gas flow. In this case, the gas-permeable element may be formed of felt-like material of Ni, like the flexible conductive member 7. However, any other material, whether conductive or not, may be employed instead.

(6) The material of the flexible conductive member 7 for allowing gas passage therethrough may vary in manner different ways. For instance, this member may be provided in the form of sponge. Or, ceramic felt-like material having good heat resistance and reduction resistance as well as electric conductivity may be employed.

(7) In case the flexible conductive member 7 consists of the portions divided into the cell stacking direction so that each portion includes a vacant forming portion for forming the vacant portion V and this vacant portion V is formed by overlapping the divided portions with each other, the manner of dividing this flexible conductive member 7 in the cell stacking direction so that each divided portion includes a vacant forming portion may be varied in many ways, other than those described hereinbefore in the foregoing embodiments.

For instance, the first conductive member 7A may be divided further into two portions, i.e. a plate-like portion and a slit-forming portion including slits for forming the vacant portion V.

Further, the conductive member 7 may be divided into two portions each of which includes recesses for forming the vacant portion V, so that the recesses of these two portions when overlapped with each other together form the vacant portion V.

(8) The passage cross-sectional shape of the temperature-difference restricting flow portion P (i.e. the cross sectional shape in the direction of the face extending normal to the direction of gas flow) is not limited to the rectangular shape described in the foregoing embodiments, but may be circular or oval, for instance.

(9) In the foregoing embodiments, the flexible conductive member 7 is charged only between the passage forming member 4 and the fuel electrode 3. Instead, the flexible conductive member 7 may be charged also between the passage forming member and the oxygen electrode 2, thus providing the temperature-difference restricting portion P.

(10) In the foregoing embodiments, the passage forming member 4 is attached to the side of the electrolyte layer 1 facing the oxygen electrode 2 so as to form the oxygen-containing gas passages (s). Instead, a passage forming member for forming fuel passages (f) may be provided also on the other side of the electrolyte layer 1 facing the fuel electrode 3.

In this case, the flexible conductive member 7 will be charged between the passage forming member for forming fuel passages and the fuel electrode 3.

(11) In the foregoing embodiments, in constructing the cell C, the passage forming member 4 is attached to the side of the electrolyte layer 1 facing the oxygen electrode 2 so as to form the oxygen-containing gas passages (s). Alternatively, the passage forming member 4 may be attached to the other side of the electrolyte layer 1 facing the fuel electrode 3 so as to form the oxygen-containing gas passages (s).

In this case, a plurality of cells C will be stacked with a distance therebetween so as to form the oxygen-containing gas passages (s) between the adjacent cells and the flexible conductive member 7 will be charged between the adjacent cells C in the cell stacking direction.

FIFTH EMBODIMENT

A fifth embodiment of the present invention will be described next with reference to FIGS. 21 through 26.

Figure 11:
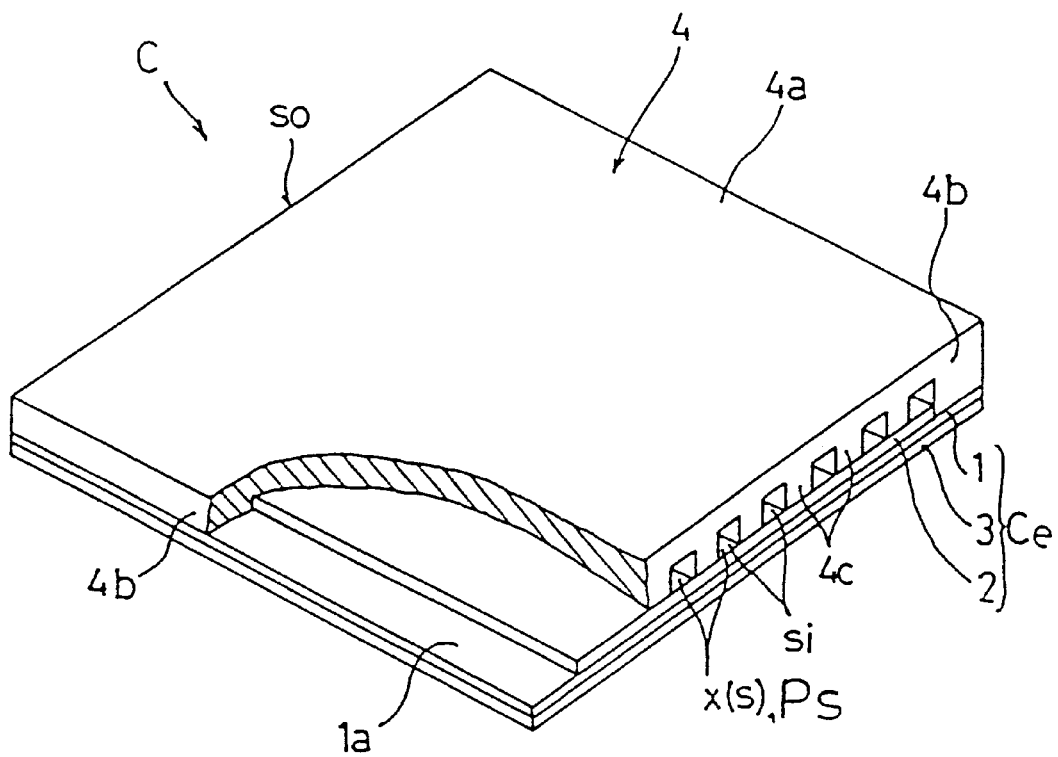
FIG. 11 is a perspective view showing a cell construction of fuel cell relating to the first embodiment.
Figure 12:
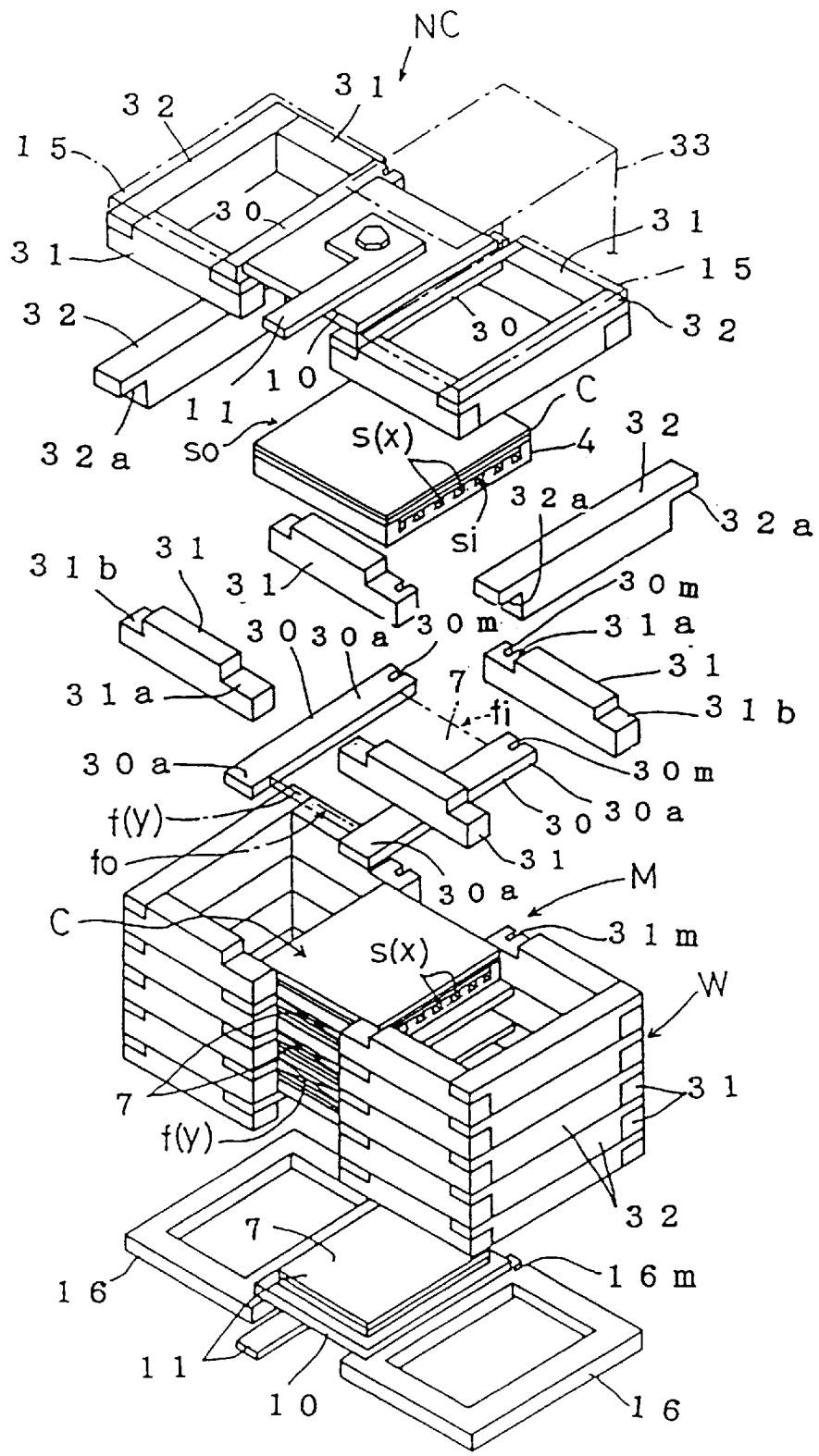
FIG. 12 is an exploded perspective view showing a stacked cell assembly of a fuel cell relating to the first embodiment.
Figure 13:
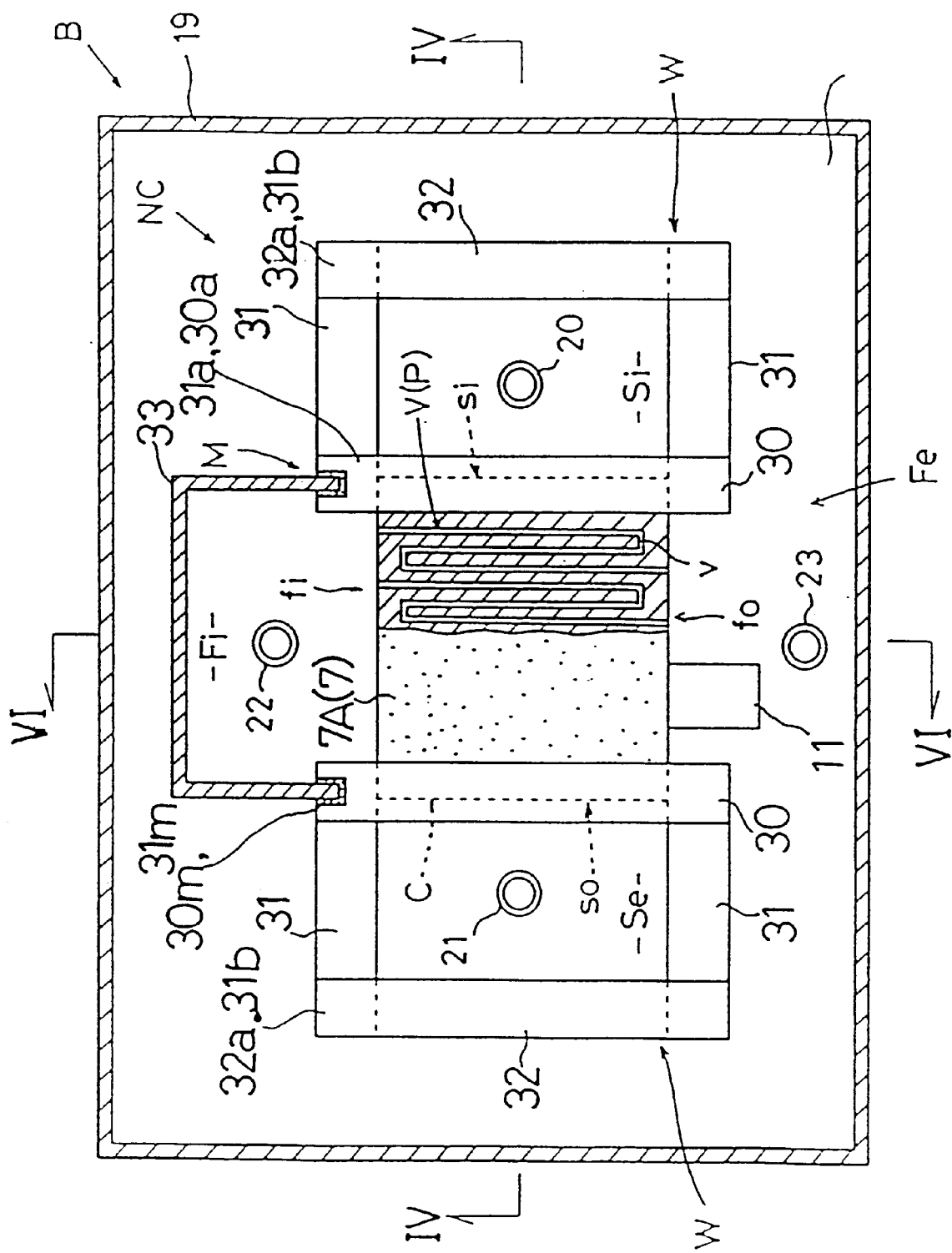
FIG. 13 is a plan view in horizontal section showing an entire construction of the fuel cell relating to the first embodiment.
Figure 14:
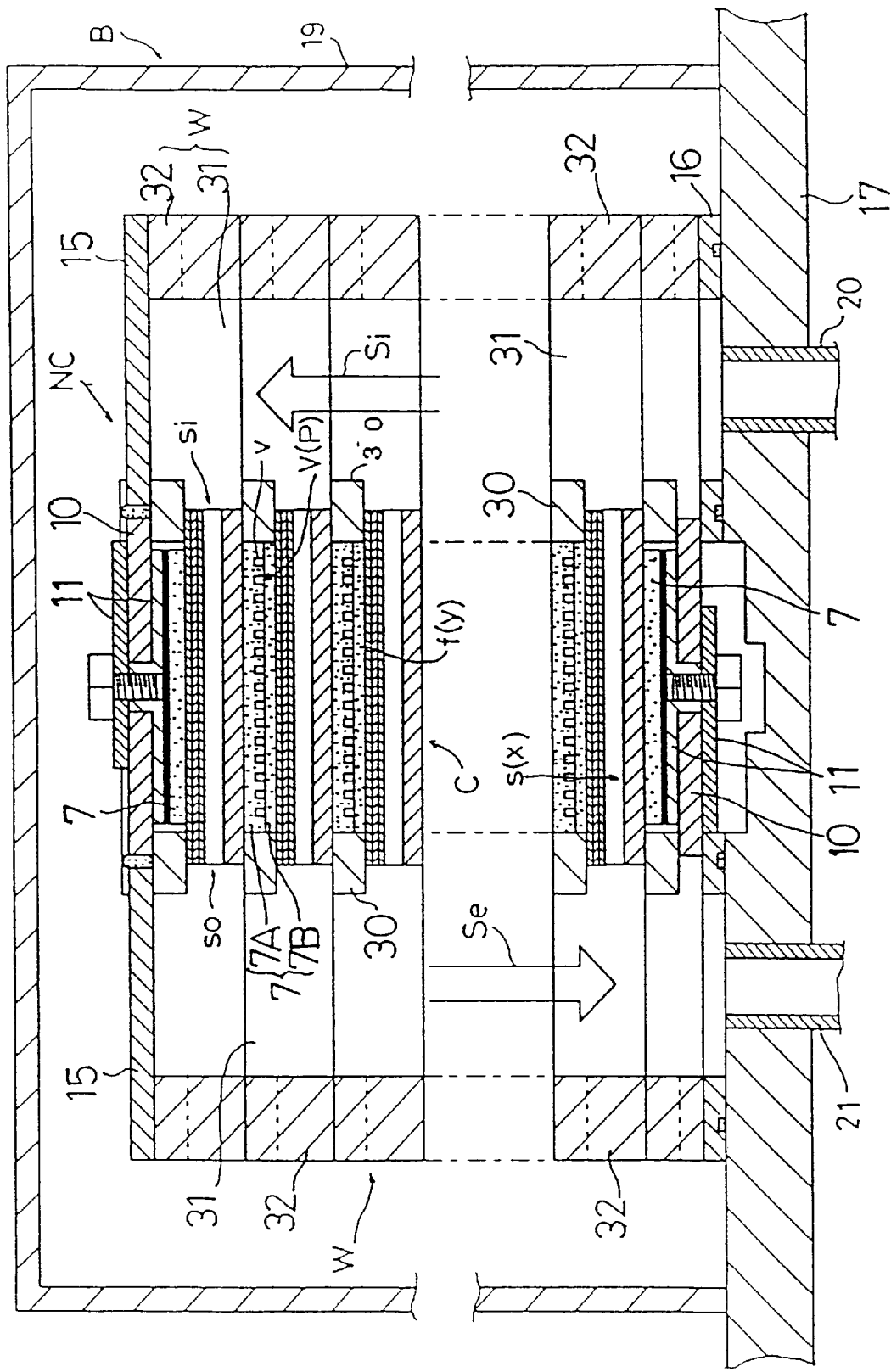
FIG. 14 is a section view taken along a line IV—IV in FIG. 13.
Figure 15:
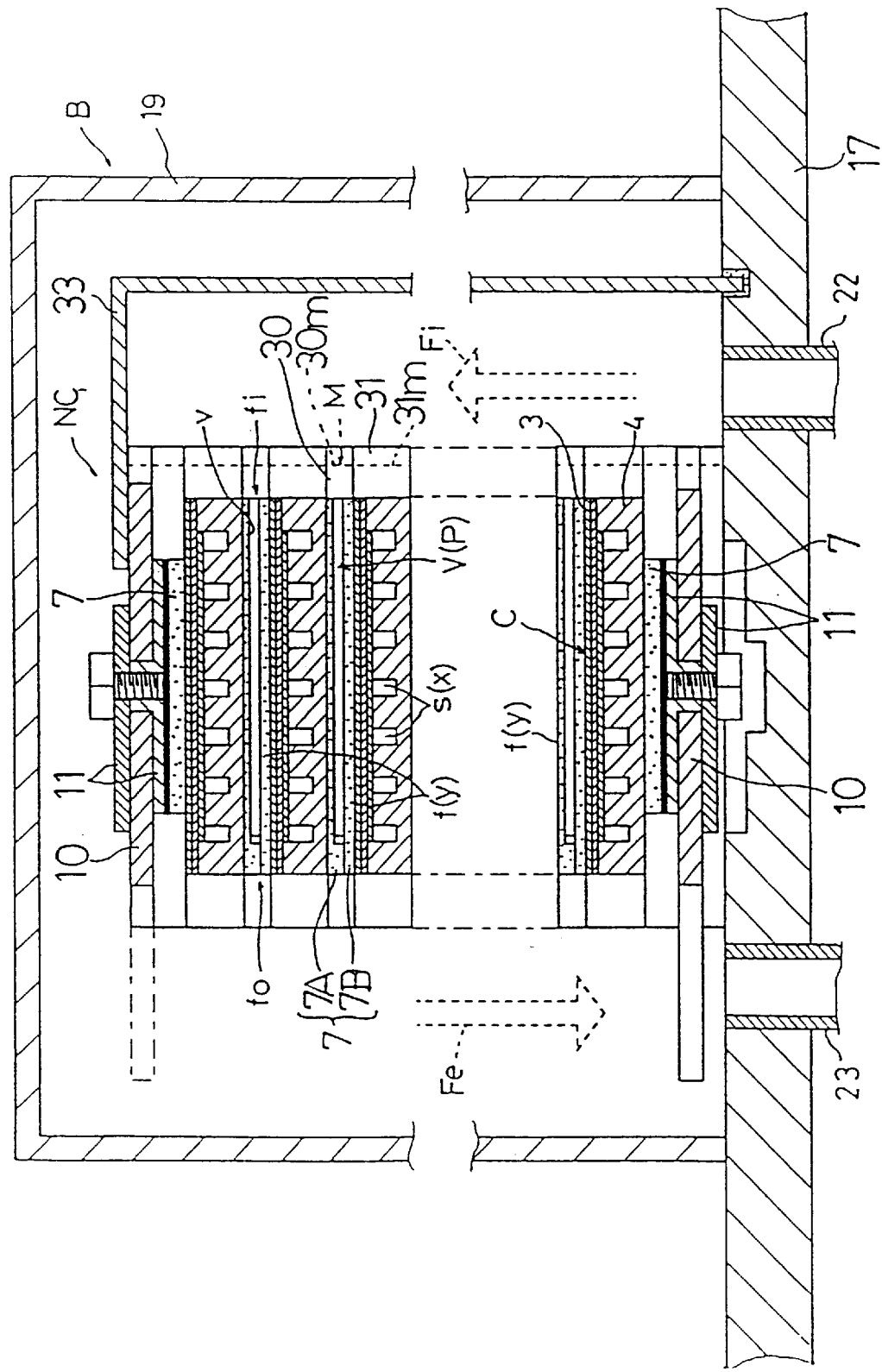
FIG. 15 is a section view taken along a line VI—IV in FIG. 13.

The construction of the cell C in this embodiment is identical to that shown in FIG. 1 or FIG. 11.

As shown in FIG. 11, in each oxygen-containing gas passage (s), the oxygen-containing gas flows straight over the entire width of the passage along the opened end edge of the cell C from the supply opening si to the exhaust opening so. That is to say, the oxygen-containing gas passage (s) is provided as a straight passage Ps having a passage forming direction extending from one end opening to the other end opening.

Incidentally, in the following description, the end face of the cell C where the end opening of the oxygen-containing gas passage (s) is located will be referred to as the opened end edge and the further end face of the cell C where the oxygen-containing gas passage (s) is closed will be referred to as the closed end face, respectively.

Next, FIGS. 21 through 24 show the construction for forming the stacked cell assembly NC. As this construction is substantially identical to that illustrated in FIGS. 12 through 15, detailed description of this construction will be avoided.

The fuel gas passage (f) is constructed as a curved passage Pt such that the fuel gas introduced through its one end opening is caused to run in the same direction as the straight passage Ps and then run in a different direction to be exhausted through the other end opening.

Incidentally, one of the pair of end openings of the fuel gas passage (f) is used as a supply opening fi of the fuel gas and the other is used as an exhaust opening fo of the fuel gas, respectively.

Accordingly, a pair of end openings si, so functioning respectively as a supply opening and an exhaust opening of the oxygen-containing gas passage (s) are provided at each of the pair of opposed end edges of the solid electrolyte layer 1, and a pair of end openings fi, fo functioning respectively as a supply opening and an exhaust opening of the fuel gas passage (f) are provided at each of the other pair of opposed end edges of the solid electrolyte layer 1.

The flexible conductive member 7 will be described in greater details.

Figure 25:
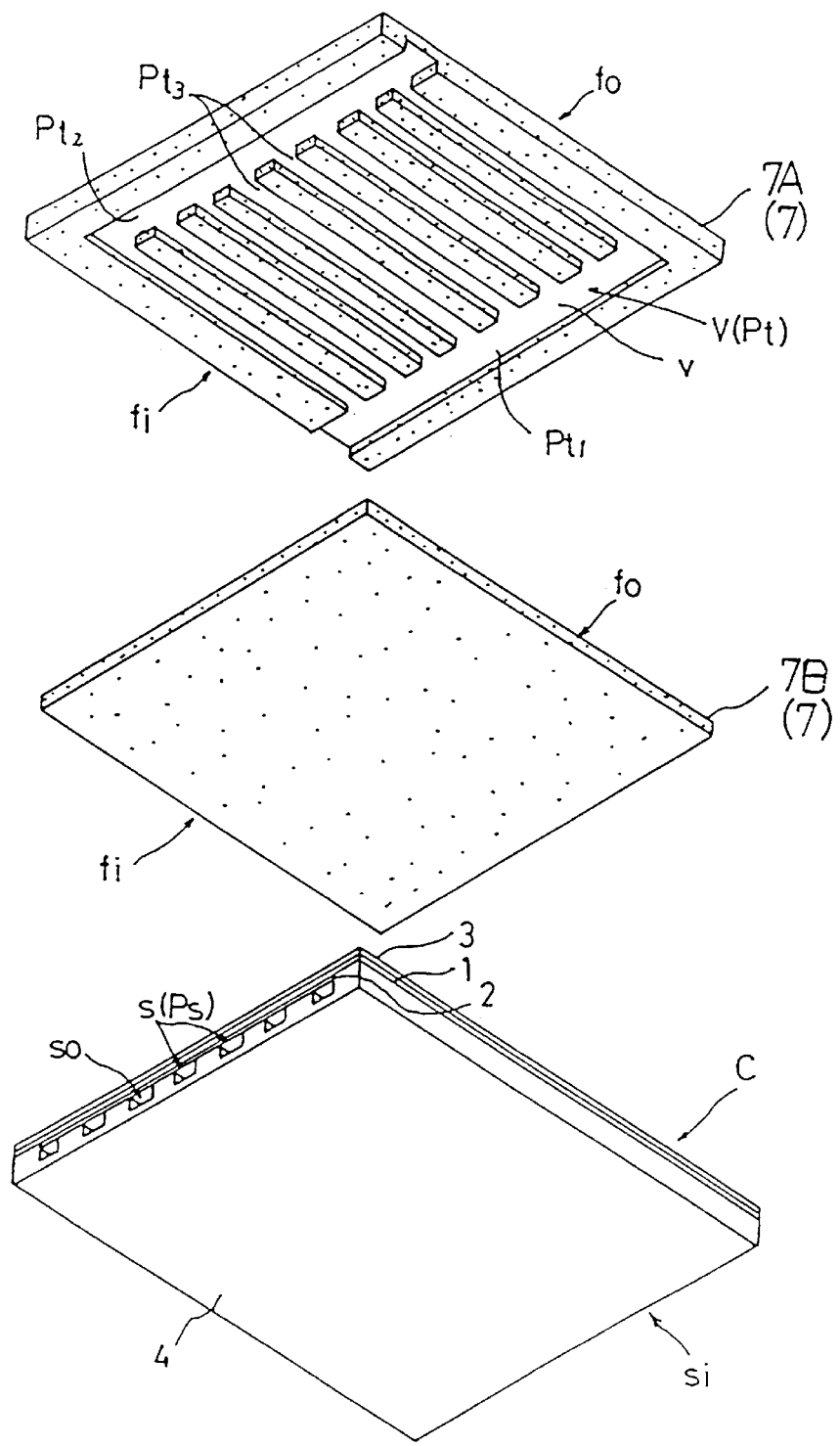
FIG. 25 is an exploded perspective view showing a construction of a flexible conductive member.
Figure 26:
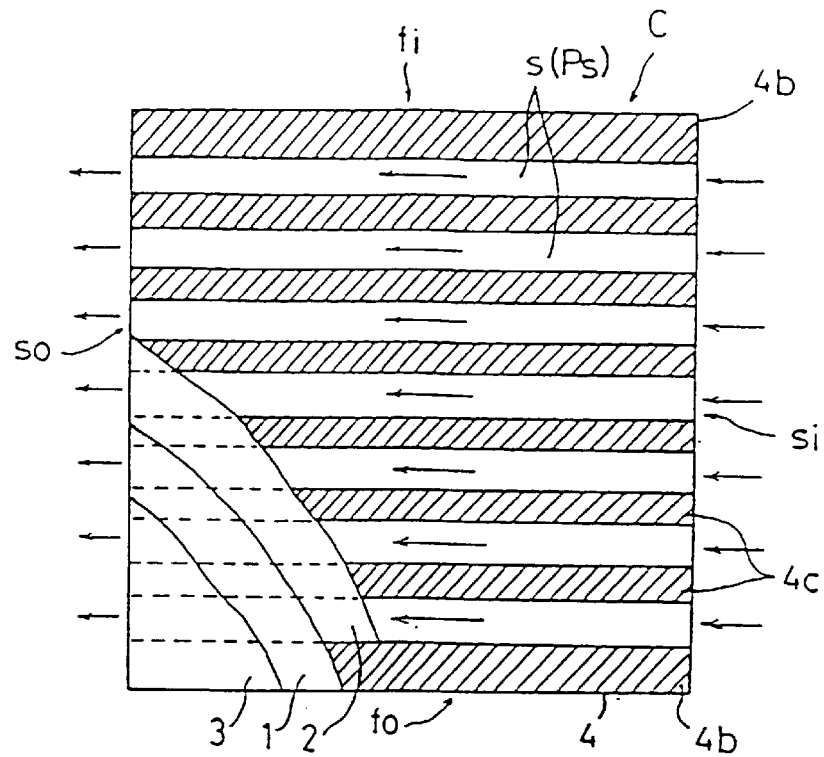
FIG. 26(a) and FIG. 26(b) are views illustrating flow conditions of oxygen-containing gas and fuel gas.
Figure 26:
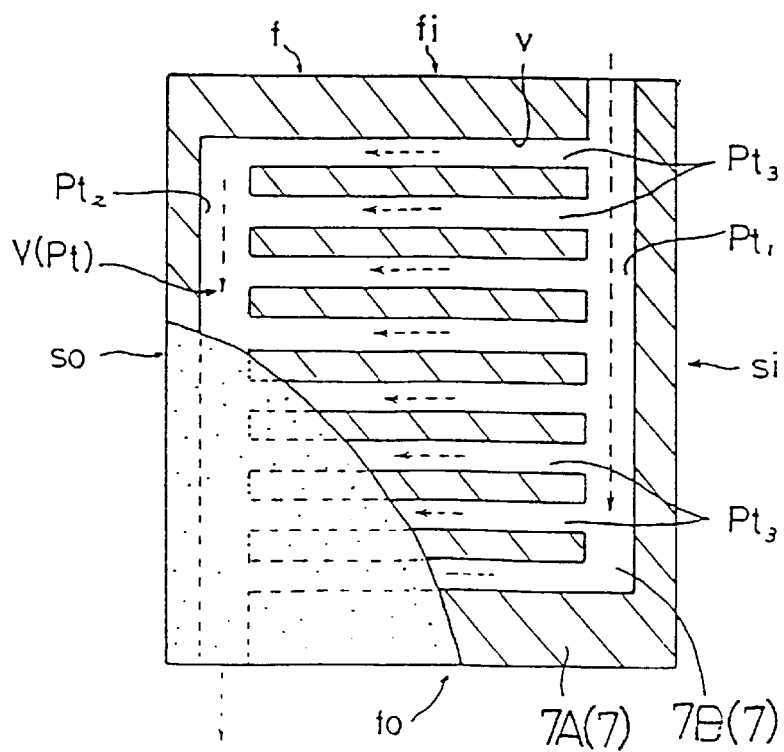

As shown also in FIGS. 25 and 26, the curved passage Pt is realized by providing an intermediate portion of the flexible conductive member 7 in the cell stacking direction with the vacant portion V for flowing the gas with switching over its flow direction.

This curved passage Pt includes, in the cell stacking direction, a first main passage portion $Pt_1$ having an end opened in the end face of the one opened end of the fuel gas passage (f) at the end on the side of the supply opening si of the oxygen-containing gas passage (s) and extending along the end edge on the side of the supply opening si of the oxygen-containing gas passage (s) straight to a position before the end edge on the other opened end of the fuel gas passage (f), a second main passage portion $Pt_2$ having an end opened in the face on the side of the other end opening of the fuel gas passage (f) and extending along the end edge on the side of the exhaust opening so of the oxygen-containing gas passage so straight to a position before the end edge on the side of one opened end of the fuel gas passage (f), and a plurality of communicating passage portions $Pt_3$ each extending straight in the direction normal to the end edge where the supply opening si of the oxygen-containing gas passage (s) is located (i.e. the forming direction of the oxygen-containing gas passage (s)) and having opposed ends each of which is communicated with the first main passage portion $Pt_1$ and the second main passage portion $Pt_2$ respectively, the passage portions $Pt_3$ being disposed side by side along the end edge where the supply opening si of the oxygen-containing gas passage (s) is located and also over the entire width of this end edge.

Accordingly, the plurality of communicating passage portions $Pt_3$ function as passage portions and extending substantially over the entire length between the one pair of end openings si, so and substantially over the entire length between the other pair of end openings fi, fo, so that the passage portions can flow the oxygen-containing gas and the fuel gas in the same direction as the oxygen-containing gas passage (s).

Then, as shown in FIG. 26(b), of the pair of end openings of the fuel gas passage (f), the one where the first main passage portion $Pt_1$ is used as the supply opening fi and the other where the second main passage portion $Pt_2$ is opened is used as the exhaust opening fo. With this, the oxygen-containing gas and the fuel gas may be caused to flow in the same direction respectively through the oxygen-containing gas passage (s) and the fuel gas passage (f) over substantially entire surface of the solid electrolyte layer 1.

The flexible conductive member 7 is divided into two portions between the first conductive member 7A including, in one side thereof, recesses (v) for forming the vacant portion V and the second conductive member 7B to be overlapped with the first conductive member 7A for closing the recesses (v). Then, as the first conductive member 7A and the second conductive member 7B are overlapped with each other, the recesses (v) of the first conductive member 7A are closed by the second conductive member 7B, thus forming the vacant portion V. That is to say, the recesses (v) of the first conductive member 7A and the face of the second conductive member 7B facing the first conductive member 7A function respectively as the vacant forming portion.

The first conductive member 7A is formed by press-forming felt-like Ni material on a rectangular plate having a substantially same area as the cell C so as to form the recesses (v) on one side of the plate.

The second conductive member 7B is formed by press-forming felt-like Ni material on a rectangular plate having a substantially same area as the first conductive member 7A.

The distance retaining member 9 and the frame forming member W are same as those of the third embodiment and therefore will not be described here.

Also, the construction shown in FIGS. 21 through 24 for obtaining electric power from the stacked cell assembly NC and the general construction of the fuel cell are identical to those of the third embodiment and therefore will not be described here.

Next, with reference to FIG. 26, the flow condition of the oxygen-containing gas in the oxygen-containing gas passage (s) and the flow condition of the fuel gas in the fuel gas passage (f) will be described.

Incidentally, in FIG. 26(a), the cell C is shown in a partially cutaway condition in the face direction thereof at an intermediate portion of the conductive separator in the cell stacking direction, and in FIG. 26(b), the flexible conductive member 7 is shown in a partially cutaway condition in the face direction thereof at an intermediate portion in the cell stacking direction. In FIG. 26, the flows of the oxygen-containing gas are denoted with solid lines and those of the fuel gas are denoted with broken lines, respectively.

As shown in FIG. 26(a), the oxygen-containing gas flows straight in each oxygen-containing gas passage (s) over the entire width of this passage from the supply opening si to the exhaust opening so.

On the other hand, the fuel gas flows through the opening at the end of the first main passage portion $Pt_1$ into the curve passage Pt and then through the first main passage portion $Pt_1$, the respective communicating passage portions $Pt_3$ and the second main passage portion $Pt_2$ and flows out of the opening at the end of the second main passage portion $Pt_2$.

The fuel gas, in each communicating passage portion $Pt_3$, flows in the same direction as the oxygen-containing gas flowing through the oxygen-containing gas passage (s).

OTHER EMBODIMENTS

Next, some other embodiments of the invention will be described.

(1) In the foregoing embodiment, the flow direction of the oxygen-containing gas in the oxygen-containing gas passage (s) is same as the flow direction of the fuel gas in the fuel gas passage (f). Instead, the flow direction of the oxygen-containing gas in the oxygen-containing gas passage (s) and the flow direction of the fuel gas in the fuel gas passage (f) may be opposite to each other.

Figure 27A:
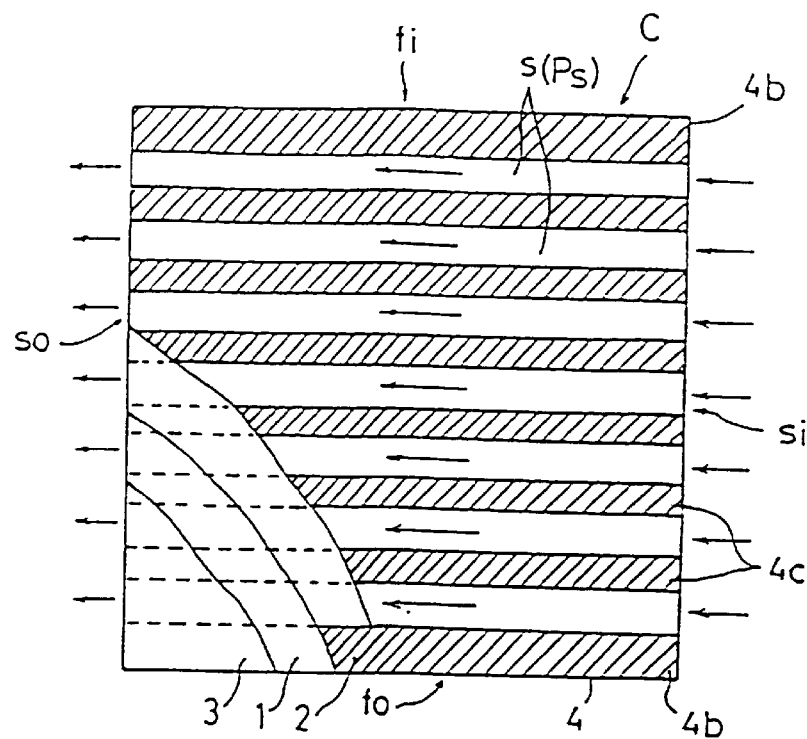
FIG. 27(a) and FIG. 27(b) are views illustrating flow conditions of oxygen-containing gas and fuel gas in a further embodiment.
Figure 27B:
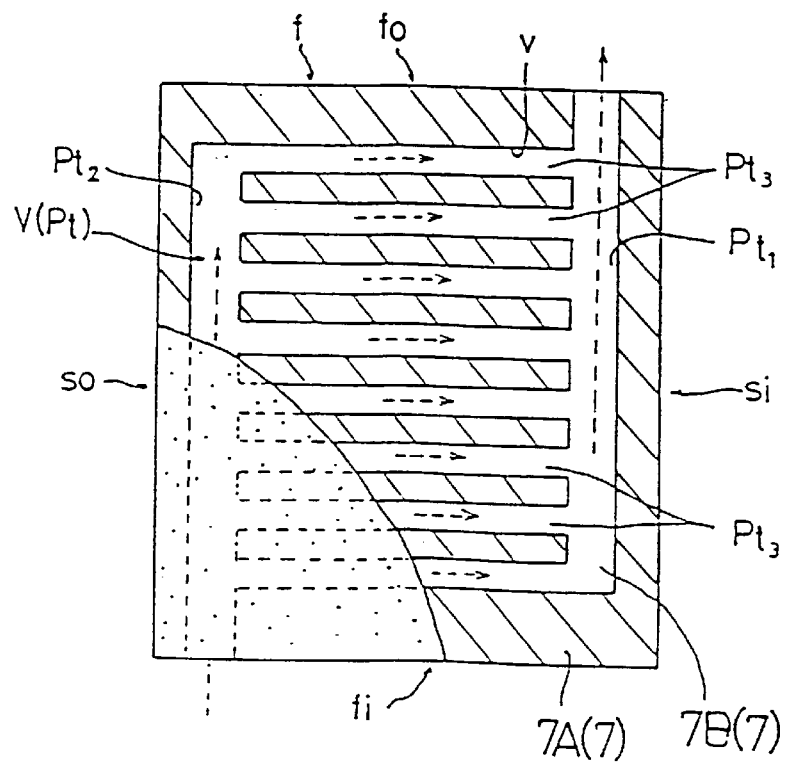
Figure 28:
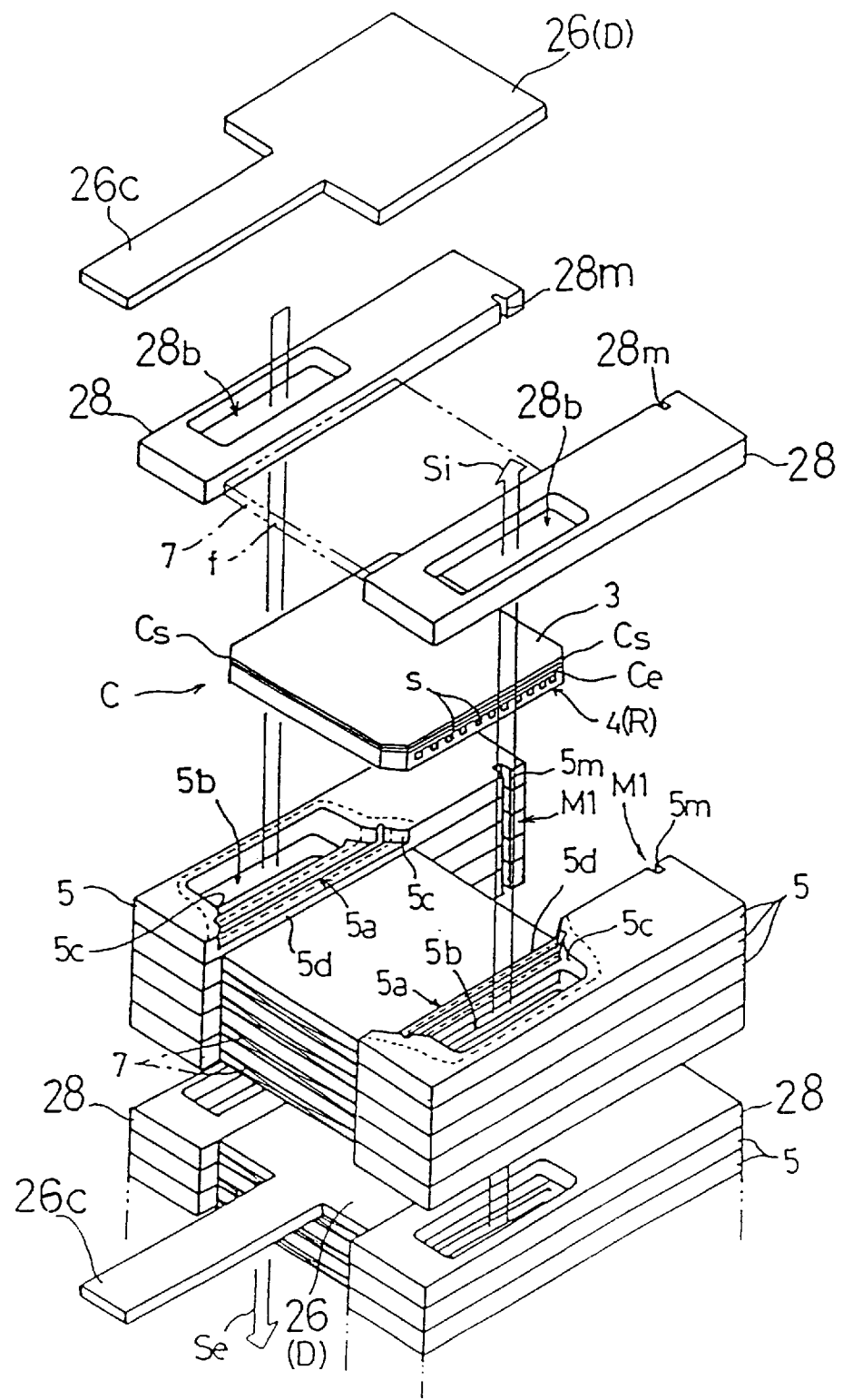
FIG. 28 is an exploded perspective view showing principal portions of a fuel cell relating to a sixth embodiment of the invention.

In this case, as shown in FIG. 27, of the pair of end openings of the fuel passage (f), the one where the second main passage portion $Pt_2$ is opened may be used as the supply opening fi and the other where the first main passage portion $Pt_1$ is opened may be used as the exhaust opening fo, respectively.

Incidentally, for the purpose of minimizing the temperature distribution in the face direction of the cell C, whether the flow direction of the oxygen-containing gas in the oxygen-containing gas passage (s) and the flow direction of the fuel gas in the fuel gas passage (f) are same as or opposite to each other may be conveniently determined, depending on the flow amount of the oxygen-containing gas or fuel gas. For instance, when the flow amount of the oxygen-containing gas is small, the directions may be opposite to each other. Whereas, when the amount of the oxygen-containing gas is large, the directions may be same as each other.

(2) In the foregoing embodiment, the oxygen-containing gas passage (s) is formed as the straight passage Ps, while the fuel gas passage (f) is formed as the curved passage Pt. Conversely, the fuel gas may be formed as a straight passage Ps and the oxygen-containing gas passage (s) may be formed as a curved passage Pt.

In this case, the curved passage Pt will be realized by providing the face of the conductive separator 4 facing the oxygen electrode 2 with the recesses for flowing the gas with switching over its direction.

(3) In the foregoing embodiment, the oxygen-containing gas passage (s) is formed as the straight passage Ps, while the fuel gas passage (f) is formed as the curved passage Pt. Alternatively, both of the oxygen-containing gas passage (s) and the fuel gas passage (f) may be formed as the curved passages Pt.

(4) In the foregoing embodiment, the curved passage Pt is realized by providing an intermediate portion of the flexible conductive member 7 in the cell stacking direction with the vacant portion V for flowing the gas with switching over its flow direction. Instead, a metal plate-like member of e.g. Ni may be provided at the intermediate portion of the flexible conductive member 7 in the cell stacking direction and then the vacant portion for flowing the gas with switching over its flow direction may be provided in this metal plate-like member.

(5) The material of the flexible conductive member 7 for allowing gas passage therethrough may vary in manner different ways. For instance, this member may be provided in the form of sponge. Or, ceramic felt-like material having good heat resistance and reduction resistance as well as electric conductivity may be employed.

(6) In case the flexible conductive member 7 consists of the portions divided into the cell stacking direction so that each portion includes a vacant forming portion for forming the vacant portion V and this vacant portion V is formed by overlapping the divided portions with each other, the manner of dividing this flexible conductive member 7 in the cell stacking direction so that each divided portion includes a vacant forming portion may be varied in many ways, other than those described hereinbefore in the foregoing embodiments.

For instance, the first conductive member 7A may be divided further into two portions, i.e. a plate-like portion and a slit-forming portion including slits for forming the vacant portion V.

Further, the conductive member 7 may be divided into two portions each of which includes recesses for forming the vacant portion V, so that the recesses of these two portions when overlapped with each other together form the vacant portion V.

(7) The passage cross-sectional shape of the curved passage Pt (i.e. the cross sectional shape in the direction of the side extending normal to the direction of gas flow) is not limited to the rectangular shape described in the foregoing embodiments, but may be circular or oval, for instance.

(8) In the foregoing embodiment, the passage forming member is attached to the side of the electrolyte layer 1 facing the oxygen electrode 2 so as to form the oxygen-containing gas passages (s). Further, the passage forming member may be attached also to the other side of the electrolyte layer 1 facing the fuel electrode 3 so as to form the fuel gas passages (f).

In this case, the groove functioning as the curved passage Pt will be provided to either of the two passage forming members.

SIXTH EMBODIMENT

Next, with reference to FIGS. 28 through 31, a sixth embodiment of the present invention will be described.

In this embodiment, a heat conductive member D is interposed between adjacent cells to conduct heat to its peripherals; and heat discharging means H is disposed outside the stacked cell assembly in such a manner that heat may be conducted between the heat discharging means H and the heat conductive member D. Then, the heat discharging means H may discharge heat conducted from the heat conductive member D to the outside.

In this sixth embodiment, a passage forming member R is formed of the conductive separator 4 having electric conductivity. And, this conductive separator 4 is disposed, on the side of the cell Ce facing the oxygen electrode 2, so as to form the oxygen-containing gas passages (s), with the separator 4 being electrically conductively connected with the oxygen electrode 2.

Further, the flexible conductive member 7 is charged between the conductive separator 4 and the fuel electrode 3 for forming the fuel passages (f) as well as for allowing gas passage between the conductive separator 4 and the fuel electrode 3, such that the conductive separator 4 and the fuel electrode 3 are electrically conductively connected with each other. With these, the adjacent cells Ce are electrically conductively connected with each other.

The heat conductive member 7 is disposed inside the flexible conductive member 7.

The construction of the cell Ce of the fuel cell is identical to that described hereinbefore and therefore will not be described here.

Next, with reference to FIGS. 28 through 31, there will be described a construction for forming the stacked cell assembly NC by stacking a plurality of separator-attached cells C in the thickness direction in an electrically serially connected condition.

The construction of the cell retaining member 5 is identical to that of the first embodiment and therefore will not be described here.

The heat conductive member D is disposed between every some adjacent separator-attached cells C with some cells interposed therebetween. Next, the disposing arrangement of the heat conductive member D will be described in greater details.

When the heat conductive member D is provided between every some adjacent separator-attached cells C, of those separator-attached cells C disposed between the conductive members D, the cell located at the substantial center in the cell stacking direction will experience the highest temperature. Therefore, the number of the interposing cells C between the heat conductive members should be determined in such a manner that the temperature of such cell located at the substantial center will be appropriate.

The heat conductive member D is formed of a metal plate-like member 26, which includes a connecting portion 26c projecting from the separator-attached cells.

Of the plurality of separator-attached cells, between those to which the plate-like member 26 is attached, each of the pair of distance retaining members 28 is disposed to be overlapped with each of the pair of cell retaining members 5, thereby to increase the distance between the separator-attached cells C, and within this space, the plate-like member 26 is interposed to be placed in contact with the opposed flexible conductive members 7 in the cell stacking direction. With this, the ambient heat may be conducted via the flexible conductive members 7 to the plate-like member 26.

The distance-retaining member 28 is provided in the form of a rectangular plate-like member having an outer configuration, in the cell stacking direction, identical to that of the cell retaining member 5, and this member 28 forms a hole 28b to be overlapped with the hole 5b of the cell retaining member 5 and a groove 28m to be overlapped with the groove 5m of the retaining member 5.

The metal plate-like member 26 is to be exposed to reducing atmosphere. Therefore, this member 26 is formed of Ni having good heat resistance and electric conductivity.

Each of the cell retaining member 5 and the distance-retaining member 28 is formed of ceramic material having heat resistance and electric insulating property.

Figure 29:
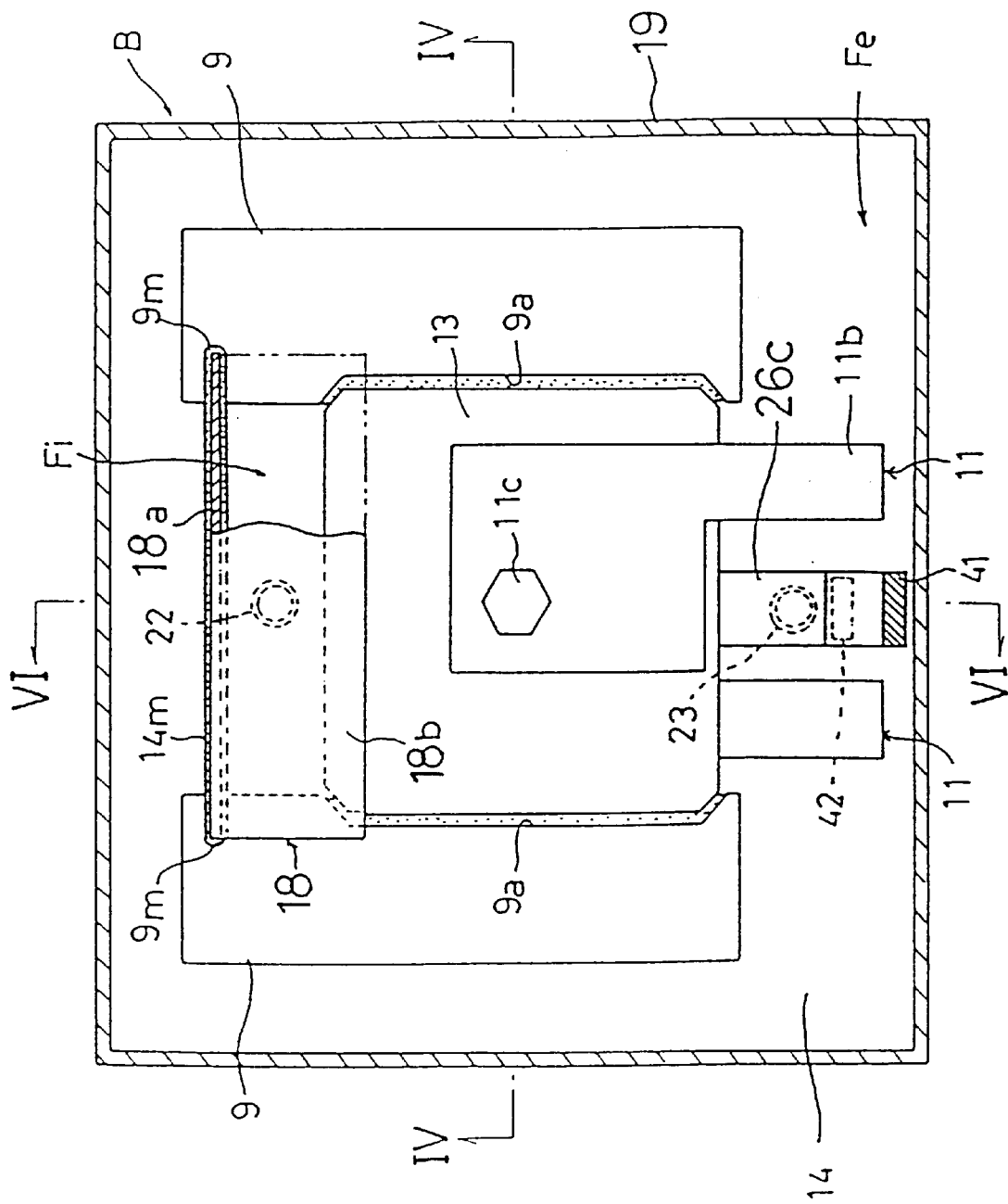
FIG. 29 is a plan view in horizontal section showing the fuel cell relating to the sixth embodiment.
Figure 30:
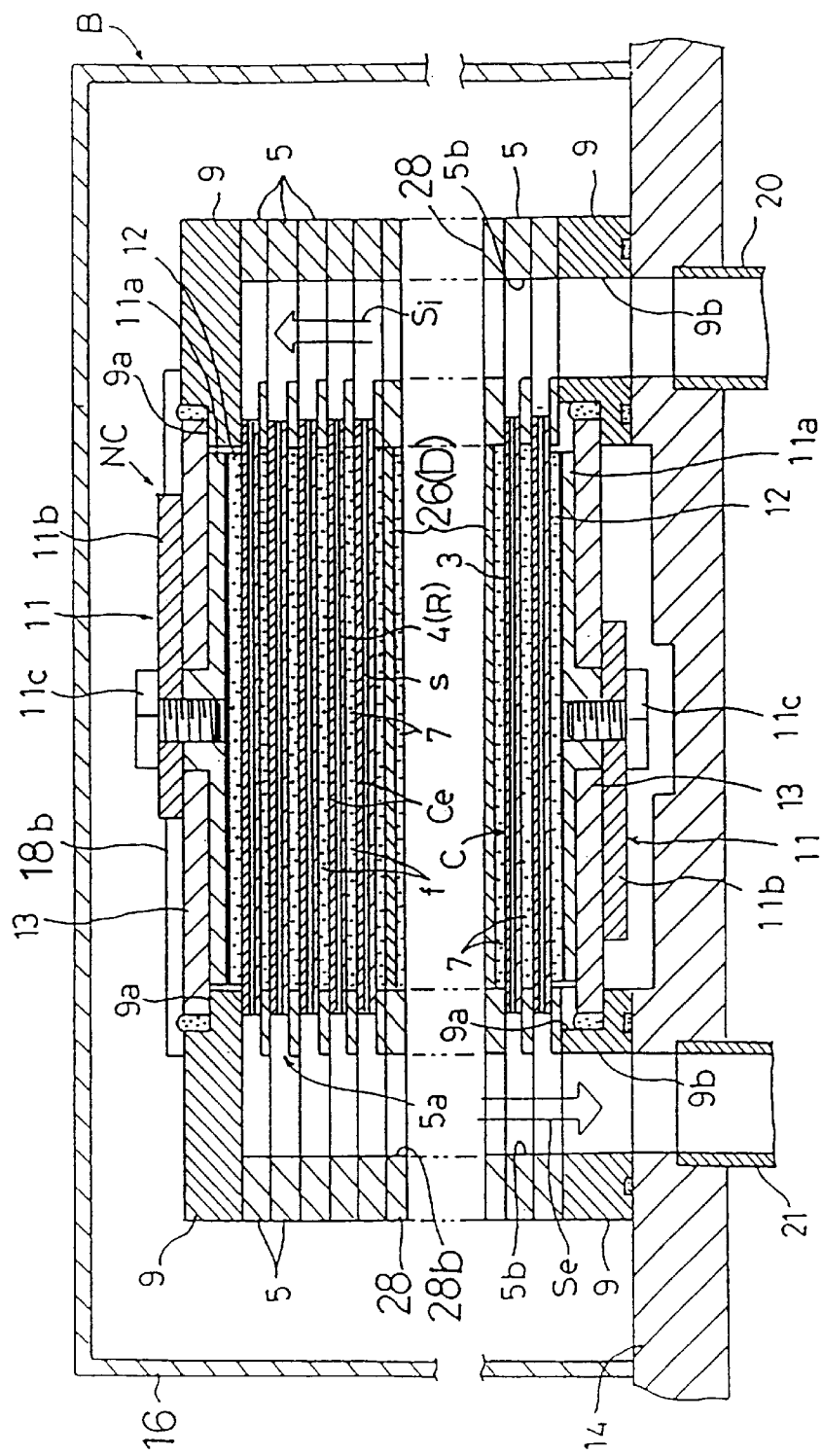
FIG. 30 is a section taken along a line IV—IV in FIG. 29.
Figure 31:
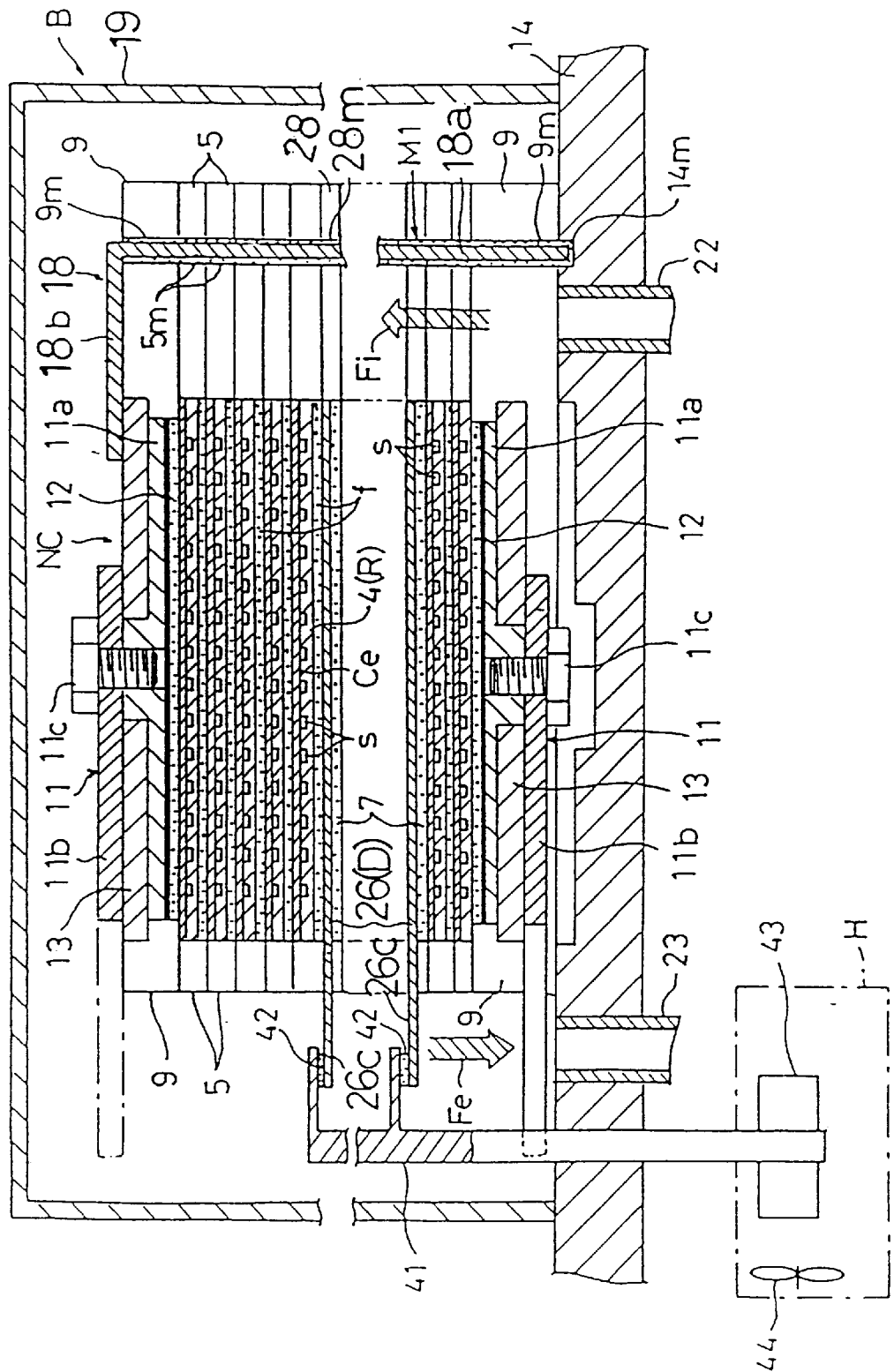
FIG. 31 is a section taken along a line VI—VI in FIG. 29.

Next, with reference to FIGS. 29 through 31, there will be described a construction for obtaining electric power from the end of the stacked cell assembly NC in the cell stacking direction. The basic construction is same as that of the first embodiment. Therefore, only different portions will be described here.

To each of opposed separator-attached cells C in the cell stacking direction of the stacked cell assembly NC, there is provided a conductive felt-like member 12 is placed in contact therewith. Further, a collector portion 11 supported to a collector portion support member 13 is disposed in contact with the conductive felt-like member 12, so that electric power may be obtained from the collector portion 11.

More particularly, the collector portion 11 includes a collector plate 11 and a terminal plate 11b disposed on the opposed side of the collector portion support member 13, and a metal bolt 11c extending through the collector plate 11b and the collector portion support member 13 and threaded with the collector plate 11a thereby to electrically conductively connect the collector plate 11a and the terminal plate 11 with each other and also to integrally attach the collector plate 11a and the terminal plate 11b with the collector portion support member 13.

Further, the collector portion support member 13 to which the collector portion 11 is supported is retained to the pair of collector portion retaining members 9, with opposed end edges of the member 13 being inserted into the respective cut-in portions 9a of the pair of collector portion retaining members 9, and with the conductive felt-like member 12 being placed in contact with the collector plate 11a of the collector portion 11 and also the separator-attached cell C.

The collector portion retaining member 9 and the collector portion support member 13 are both formed of ceramic material having heat resistance and electric insulating property. The collector plate 11a, the terminal plate 11b and the bolt 11c of the collector portion 11 are formed respectively of Ni, and the conductive felt-like member 12 is formed of felt-like Ni material.

Next, with reference to FIGS. 28 through 31, the general construction of the fuel cell will be described.

The stacked cell assembly NC having the above-described construction is mounted on a base mount 14.

In a top face of the base mount 14, there is formed a groove 14a having opposed ends thereof communicated with the groove 9m of each of the pair of collector portion retaining members 9.

A wall partitioning member 18 has a side wall portion 18a and a lid portion 18b which are Ishaped. Then, end edges of the side wall portion 18a are inserted into the pair of grooves M1 and a groove 14a of the base mount 14, and also the lid portion 18b is laid over the pair of collector portion retaining members 9 and the collector support member 13, so that the supply fuel gas passage Fi communicated with the respective fuel gas passages (f) is formed.

Further, a bottomed prism-like member 19 is mounted on the base mount 14 in such a manner that the member 19 accommodates the stacked cell assembly NC therein. That is to say, the bottomed prism-like member 19 forms a box-like body B in which the stacked cell assembly NC is accommodated.

The one-side openings of the fuel gas passages (f) of the respective separator-attached cells C are exposed to the inside of the box-like body B.

And, this inner space of the box-like body B is used as the exhaust fuel gas passage Fe communicated with the respective fuel gas passages (f).

The supply oxygen gas passage Si is communicated with an oxygen-containing gas supply pipe 20 via the base amount 14. Whereas, the exhaust oxygen gas passage So is communicated with an oxygen-containing gas exhaust pipe 21 via the base mount 14.

Next, with reference to FIG. 31, the heat discharging means H will be described in greater details.

A bar-like heat conductive member 41 is connected heat conductively and electrically insulatedly via an electric insulating member 42 having good heat conductivity with a connecting portion 26c of each heat conductive member 26, and one end of the conductive member 41 is caused to extend through the base mount 14 to project to the outside of the box-like body B.

At this end of heat conductive member 41 projecting to the outside of the box-like body B, there are attached a plurality of heat discharging fins 43.

The heat discharging means H comprises the fins 43 attached to the end of the heat conductive member 41 and a blower 44 for feeding air to the fins 43.

In operation, by feeding air to the fins 43 by the blower 44, heat generated inside the stacked cell assembly NC may be conducted via the electric insulating member 42 and the heat conductive member 41 to the fins 44, so that the heat may be discharged from these fins 43.

SEVENTH EMBODIMENT

Figure 32:
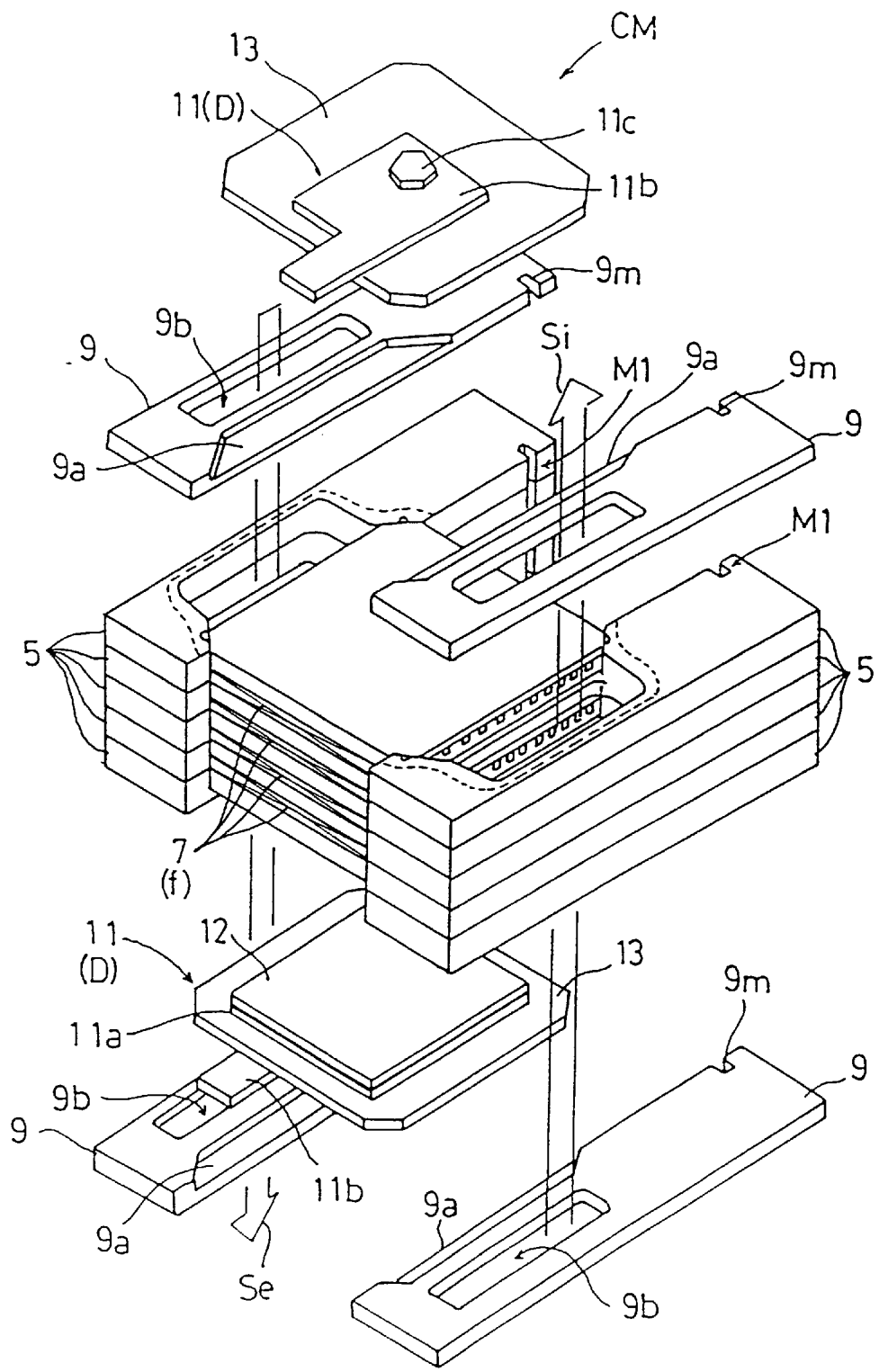
FIG. 32 is an exploded perspective view showing a cell module of a fuel cell relating to a seventh embodiment.
Figure 33:
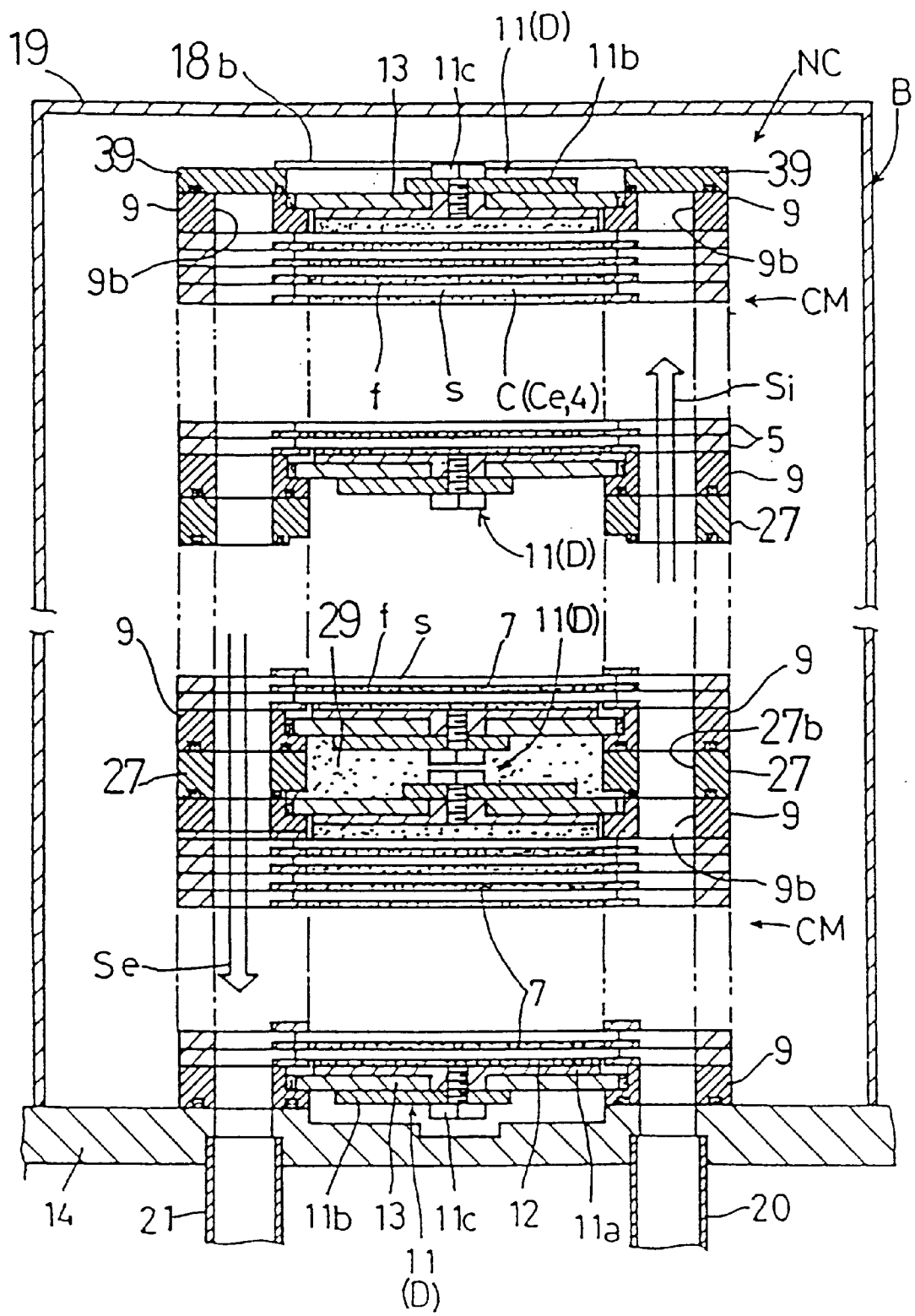
FIG. 33 is a front view in vertical section of the fuel cell relating to the seventh embodiment.
Figure 34:
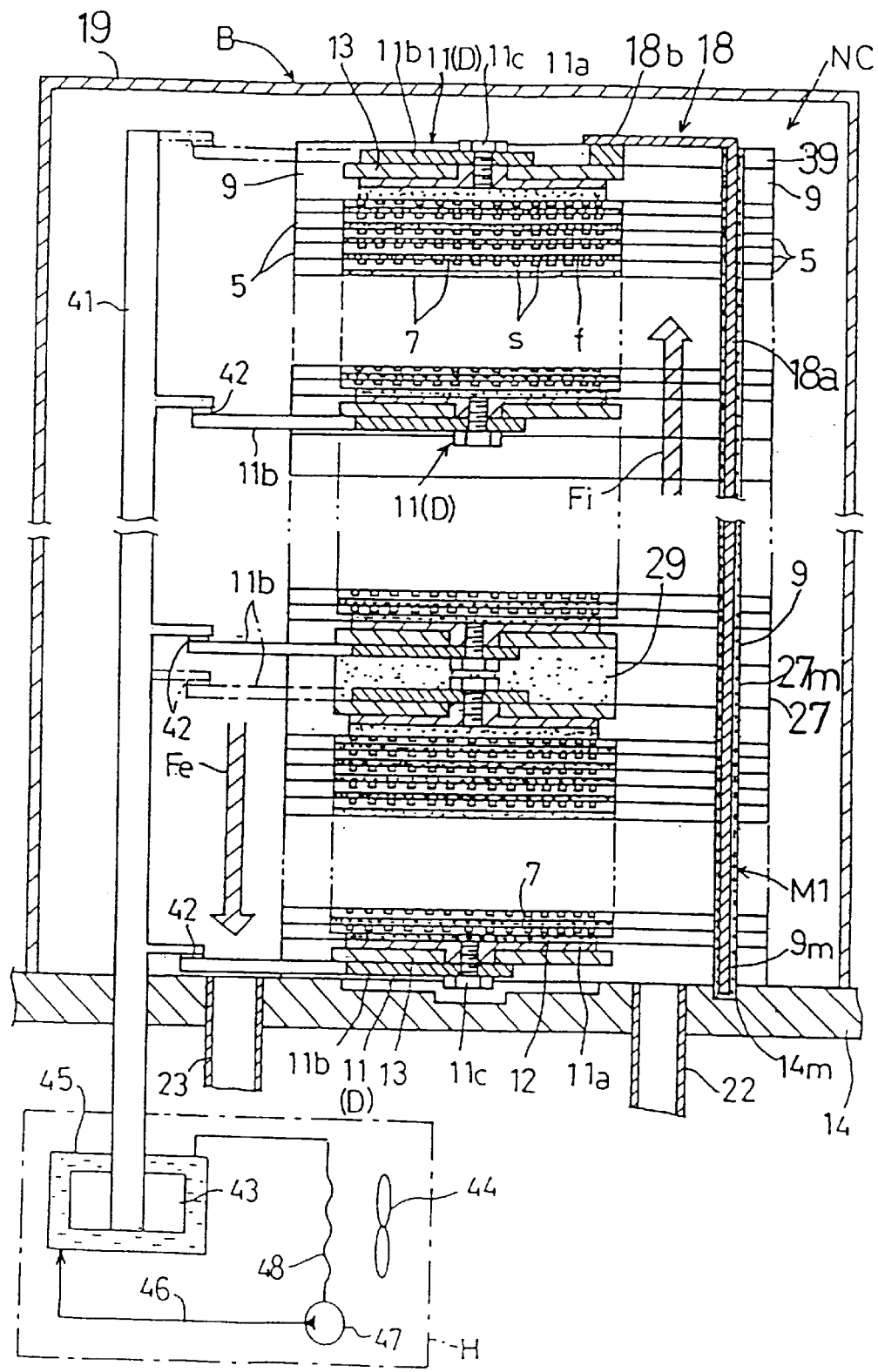
FIG. 34 is a side view in vertical section of the fuel cell relating to the seventh embodiment.

Next, with reference to FIGS. 32 through 34, a seventh embodiment of the invention will be described.

The cell Ce and the separator-attached cell C have the identical constructions as those of the sixth embodiment described above.

The plurality of separator-attached cells C together constituting the stacked cell assembly NC are divided into a plurality of groups. Then, each group of separator-attached cells C are assembled together by the cell retaining members 5 in the same manner as the first embodiment. Also, at opposed ends in the cell stacking direction, like the first embodiment, the collector portion support member 13 to which the collector portion 11 as the terminal portion is supported to the pair of collector portion retaining members 9, thus forming a cell module CM.

Then, a plurality of cell modules CM are stacked in the cell stacking direction with the adjacent modules being electrically connected with each other via the adjacent collector portions 11, thus forming the stacked cell assembly NC.

The adjacent cell modules CM are connected with each other via a pair of module connecting members 27 which are disposed to be overlapped respectively with the pair of collector portion retaining members 9.

Between the adjacent collector portions 11, there is charged a flexible conductive member 18 electrically connecting these collector portions 11 with each other.

The module connecting member 27 defines a hole 27b which has a same shape as and is overlapped with the hole 9b of the collector portion retaining member 9 in the cell stacking direction and a hole 27b which is overlapped with the groove 9m of the retaining portion.

Accordingly, the supply oxygen gas passages Si and the exhaust oxygen gas passages Se of the adjacent cell modules CM are communicated and connected with the hole 27b of the module connecting member 27.

The groove 5m of the cell retaining member 5, the groove 28m of the cell retaining member 28, the groove 9m of the collector portion retaining member 9 and the groove 27m of the module connecting member 27 are communicated continuously with each other, thereby to form a pair of grooves M1 for forming the supply fuel gas passage Fi.

Then, the stacked cell assembly NC having the above-described construction is mounted on the base mount 14, as is the case with the sixth embodiment described hereinbefore, and a wall partitioning member 18 is provided, thereby to form the supply fuel gas passage Fi communicating with the respective fuel gas passages (f).

Incidentally, upwardly of the cell module CM, there is provided a closing lid member 19 for closing the supply oxygen gas passage Si and the exhaust oxygen gas passage Se, respectively.

Further, like the sixth embodiment, the bottomed prism-like body 19 is mounted on the base mount 14, with the body 19 accommodating the stacked cell assembly NC therein. Then, the stacked cell assembly NC is housed inside the box-like body B, and the inner space of this box-like body B is utilized as the exhaust fuel gas passage Fe communicated with the respective fuel gas passages (f).

Next, with reference to FIG. 34, the heat discharging means H will be described in greater details.

A bar-like heat conductive member 41 is connected heat conductively and electrically insulatedly via an electric insulating member 42 having good heat conductivity with a connecting portion 26c of each heat conductive member 26, and one end of the conductive member 41 is caused to extend through the base mount 14 to project to the outside of the box-like body B.

At this end of heat conductive member 41 projecting to the outside of the box-like body B, there are attached a plurality of heat discharging fins 43.

The heat discharging means H comprises the fins 43 attached to the end of the heat conductive member 41, a reservoir tank 45 for reserving cooling water in which the fins 43 are submerged to be cooled, a circulating passage 46 for circulating the cooling water of the reservoir tank 45, a circulating pump 47 incorporated within the circulating passage 46, a heat exchanger 46 incorporated within the circulating passage 46, and a blower 44 acting as cooling means for cooling the cooling water passing through the heat exchanger 48.

OTHER EMBODIMENTS

Next, some other embodiments of the invention will be described.

(1) The shape of the metal plate-like member 26 as the heat conductive member is not limited to that in the foregoing embodiment, but may vary in many other ways. For instance, unevenness may be formed in the face thereof contacting the flexible conductive member 7, thus increasing the area contacting with the flexible conductive member 7 in order to improve the heat conduction from the flexible conductive member 7.

(2) In the foregoing embodiments, the heat conductive member D is formed of Ni, thus providing this heat conductive member D with electric conductivity. The material for providing the heat conductive member D with electric conductivity may vary in many ways.

For instance, the material may be any other metal than Ni having good reduction resistance or ceramic having electric conductivity.

(3) In the foregoing sixth embodiment, the heat conductive member D is provided with electric conductivity. However, the heat conductive member D may not have such electric conductivity. In this case, however, it will become necessary to connect the adjacent passage forming member R and the fuel electrode 3 electrically conductively.

(4) In the foregoing sixth embodiment, the heat conductive member D is provided within the fuel gas passage (f). Instead, the member D may be provided within the oxygen-containing gas passage (s). In this case, the heat conductive member D is to be exposed to oxidizing atmosphere. Therefore, it becomes necessary to provide the heat conductive member D with oxidization resistance.

Further alternatively, the heat conductive member D may be provided in both the fuel gas passage (f) and the oxygen-containing gas passage (s).

(5) The passage forming member R may comprise separate portions consisting of an oxygen passage forming portion Rs provided on the side of the cell Ce facing the oxygen electrode 2 for forming the oxygen-containing gas passages (s) and a fuel passage forming portion Rf provided on the other side thereof facing the fuel electrode 3 for forming the fuel gas passages (f) and the heat conductive member D having electric conductivity may be interposed between and in contact with the oxygen passage forming portion Rs and the fuel passage forming portion Rf.

(6) In the foregoing seventh embodiment, between the adjacent separator-attached cells C within the cell module CM, like the first embodiment, the plate-like member 26 as the heat conductive member D may be provided, with this plate-like member 26 being connected with the bar-like heat conductive member 41 via the electric insulating member 42.

(7) In the foregoing sixth embodiment, the number of the cells across which the heat conductive members D are provided may vary conveniently, depending on the heat generation amount of the cell Ce and/or the heat discharging capacity of the heat discharging means H.

Alternatively, the heat conductive member D may be provided between each and every pair of adjacent cells.

(8) In the foregoing respective embodiments, a temperature sensor may be provided for detecting the temperature of the cell, which is located substantially at the center in the cell stacking direction, of the plurality of cells disposed between the heat conductive members D, so that the heat discharging performance of the heat discharging means H may be controlled so as to cause the detection temperature of this temperature sensor to be maintained and set to a predetermined temperature. In this case, it becomes possible to effect the adjustment of the cell temperature in association with the output of the fuel cell, with higher precision. Consequently, the power generating efficiency of the fuel cell may be further improved.

(9) The specific construction of the heat discharging means H is not limited to those described and illustrated in the foregoing embodiments, but may vary in any other way.

For instance, heat discharging fins may be provided for discharging heat conducted from the respective heat conductive member D. And, the heat discharging means H may comprise only these heat discharging fins, without any means for cooling the fins, such as the blower 44 for feeding cooling air to the fin.

Further alternatively, it is also possible to provide means for cooling the air to be fed by the blower 44, such as an air-conditioning device.

(10) In the sixth embodiment, in the separator-attached cell C, the conductive separator 4 is attached to the side of the cell Ce facing the oxygen electrode 2 for forming the oxygen-containing gas passages (s). Instead, the separator 4 may be attached to the other side of the cell Ce facing the fuel cell 3 for forming the fuel gas passages (f).

Then, a plurality of the separator-attached cells C will be stacked in the thickness direction thereof with a distance therebetween, so that the oxygen-containing gas passages (s) may be formed between the adjacent cells ,the flexible conductive member allowing gas passage will be interposed between the adjacent cells and the heat conductive member D will be disposed inside this flexible conductive member.

The present invention may be embodied in other specific forms without departing from the spirit or essential characteristics thereof. The present embodiments are therefore to be considered in all respects as illustrative and not restrictive, the scope of the invention being indicated by the appended claims rather than the foregoing description and all changes which come within the meaning and range of equivalency of the claims are therefore intended to be embraced therein.

What is claimed is:

1. A fuel cell comprising:

a plurality of cells each of which includes a solid electrolyte layer having an oxygen electrode on one side thereof and a fuel electrode on the other side thereof, the cells being stacked one above another with a space therebetween so as to form an oxygen-containing gas passage facing the oxygen electrode and a fuel gas passage facing the fuel electrode;

a passage forming member interposed between the adjacent cells to section the oxygen-containing gas passage and the fuel gas passage, the passage forming member having electric conductivity;

a conductive member disposed within a space between the passage forming member and the fuel electrode or between the passage forming member and the oxygen electrode, the conductive member having a porous construction to allow passage of gas therethrough as well as flexibility;

the adjacent cells being electrically conductively connected with each other via the passage forming member and the conductive member; and a vacant portion provided in the space having the conductive member, the vacant portion in the form of a continuous gas passage extending between opposed ends of the fuel cell along a direction of gas flow.

2. A fuel cell as claimed in claim 1, wherein the conductive member is made of a conductive felt-like member.

3. A fuel cell as claimed in claim 1, wherein the vacant portion is provided at a position corresponding to an intermediate portion of the conductive member in the cell stacking direction.

4. A fuel cell as claimed in claim 3, wherein the vacant portion is provided as an elongate portion extending along the gas flow direction, and a plurality of such elongate vacant portions is provided side by side along the face of the cell.

5. A fuel cell as claimed in claim 3, wherein the conductive member is divided in the cell stacking direction into divided portions forming the vacant portion therebetween, the vacant portion being formed by overlapping the divided portions of the conductive member with each other.

6. A fuel cell as claimed in claim 5, wherein the conductive member includes, as separate portions, a first conductive member contacting the passage forming member and having recesses for forming the vacant portion and a second conductive member contacting the fuel electrode or the oxygen electrode and including a closing portion for closing the opening of the recesses formed in the first conductive member.

7. A fuel cell as claimed in claim 1, wherein the conductive member is divided in the cell stacking direction into two portions including a cell-side portion contacting the fuel electrode or oxygen electrode and a passage-forming-member-side portion contacting the passage forming member; and between the cell-side portion and the passage-forming-member-side portion of the conductive member there is interposed a vacant forming member forming the vacant portion in such a manner that the vacant portion is opened at least to the cell-side portion, the vacant forming member made from an electrically conductive material.

8. A fuel cell as claimed in claim 7, wherein the vacant forming member is provided in the form of a plate member having one side in contact with the cell-side portion of the conductive member and defining a groove functioning as the vacant portion.

9. A fuel cell as claimed in claim 1, wherein the conductive member has such aperture ratio arrangement in the cross sectional direction along the cell stacking direction that a portion of the conductive member contacting the fuel electrode or oxygen electrode has a greater aperture ratio than the other portion thereof.

10. A fuel cell as claimed in claim 1, wherein the vacant portion functions as a temperature-difference restricting flow portion for a flowing fuel gas or oxygen-containing gas so as to restrict temperature difference in the face direction of the electrolyte layer.

11. A fuel cell as claimed in claim 10, wherein a supply opening and an exhaust opening of the oxygen-containing gas passage are provided respectively at one opposed pair of end edges of the electrolyte layer;

a supply opening and an exhaust opening of the fuel gas passage are provided respectively at the other opposed pair of end edges of the electrolyte layer; and the temperature-difference restricting flow portion is constructed so as to cause the fuel gas or oxygen-containing gas to make a U-turn before the exhaust opening and before the supply opening and to flow back and forth between the exhaust opening and the supply opening.

12. A fuel cell as claimed in claim 11, wherein the conductive member is located between the passage forming member and the fuel electrode;

a hydrocarbon containing gas present in the fuel gas supplied through the supply opening into the fuel gas passage is modified to gas containing hydrogen gas within the fuel gas passage; and the temperature-difference restricting flow portion is constructed so as to flow the fuel gas in a concentrated manner at a portion in the stacking direction of the electrolyte layer within the fuel gas passage and then the other portion.

13. A fuel cell as claimed in claim 1, wherein a pair of end openings functioning respectively as a supply opening and an exhaust opening of the oxygen-containing gas passage is provided respectively to one opposed pair of end edges of the electrolyte layer;

a further pair of end openings functioning respectively as a supply opening and an exhaust opening of the fuel gas passage is provided respectively to the other opposed pair of end edges of the electrolyte layer; and the oxygen-containing gas passage or the fuel gas passage extends over substantially the entire width between the one opposed pair of end openings, and includes, within a range extending over substantially the entire width between the other opposed pair of end openings, passage portions where the directions of the passages are the same as each other.

14. A fuel cell as claimed in claim 13, wherein one of the oxygen-containing gas passage and the fuel gas passage is formed as a straight passage having a passage forming direction thereof extending straight from the one end opening to the other end opening; and the other of the oxygen-containing gas passage and the fuel gas passage is formed as a curved passage for flowing a gas supplied through the one end opening in the same direction as the passage forming direction of the straight passage and then flowing the gas in a different direction to be exhausted through the other end opening.

15. A fuel cell as claimed in claim 14, wherein a flexible conductive member adapted for allowing passage of gas therethrough is located between the passage forming member forming the curved passage and the fuel electrode or between the passage forming member forming the curved passage and the oxygen electrode; and the curved passage is formed by providing an intermediate portion of the electrolyte layer in the cell stacking direction with a vacant portion for flowing the gas and varying the direction of the gas flow.

16. A fuel cell as claimed in claim 1, further comprising:

a heat conductive member interposed between the adjacent cells and capable of conducting heat to its peripherals; and heat discharging means disposed outside the stacked cell assembly for discharging the heat conducted from the heat conductive member.

17. A fuel cell as claimed in claim 16, wherein said plurality of cells is divided into a plurality of groups;

the cells of each group are retained by cell retaining members, and power take-off terminal portions are provided to the opposed ends in the cell stacking direction so that a cell module is formed;

a plurality of the cell modules is stacked in the cell stacking direction, with the adjacent cell modules being electrically connected with each other via the adjacent terminal portions thereof; and the terminal portions function as the heat conductive member.

18. A fuel cell as claimed in claim 16, wherein:

a flexible conductive member is located between the passage forming member and the fuel electrode or between the passage forming member and the oxygen electrode, the flexible conductive member allowing passage of gas therethrough; and the heat conductive member is disposed inside the flexible conductive member.

19. A fuel cell as claimed in claim 16, wherein the heat conductive member is formed of metal; and the metal heat conductive member is electrically insulated and connected with the heat discharging means via an electric insulating member.

20. A fuel cell as claimed in claim 16, wherein the heat discharging means includes a fluid guiding portion allowing passage of cooling fluid therethrough, and wherein the fluid guiding portion is heat-conductively connected with the heat conductive member and cooling means for cooling the cooling fluid flowing through the fluid guiding portion.

21. A fuel cell as claimed in claim 16, wherein the heat conductive member is heat-conductively connected with the heat conductive member, and the heat discharging means is comprised of cooling means for cooling the heat conductive member.

22. A fuel cell as claimed in claim 16, wherein a heat discharging capacity of the heat discharging means is adjustable.

* * * * *